(12) United States Patent
Piao et al.

(10) Patent No.: US 12,693,114 B2
(45) Date of Patent: *Jul. 28, 2026

(54) MEASURING APPARATUS FOR MEASURING HEIGHT OF FOREIGN SUBSTANCE IN PIPE

(71) Applicants: SEOUL NATIONAL UNIVERSITY R&DB FOUNDATION, Seoul (KR); CENTER FOR ADVANCED META-MATERIALS, Daejeon (KR)

(72) Inventors: Chunguang Piao, Seoul (KR); Jeseung Lee, Seoul (KR); Yoonyoung Kim, Seoul (KR)

(73) Assignees: SEOUL NATIONAL UNIVERSITY R&DB FOUNDATION, Seoul (KR); CENTER FOR ADVANCED META-MATERIALS, Daejeon (KR)

( * ) Notice: Subject to any disclaimer, the term of this patent is extended or adjusted under 35 U.S.C. 154(b) by 381 days.

This patent is subject to a terminal disclaimer.

(21) Appl. No.: 18/274,939

(22) PCT Filed: Dec. 2, 2022

(86) PCT No.: PCT/KR2022/019511
§ 371 (c)(1),
(2) Date: Jul. 28, 2023

(87) PCT Pub. No.: WO2023/229126
PCT Pub. Date: Nov. 30, 2023

(65) Prior Publication Data
US 2025/0020456 A1     Jan. 16, 2025

(30) Foreign Application Priority Data

May 27, 2022     (KR) ........................ 10-2022-0065130

(51) Int. Cl.
*G01B 17/02*     (2006.01)
*G01N 29/34*     (2006.01)
*G01N 29/36*     (2006.01)

(52) U.S. Cl.
CPC ........... *G01B 17/02* (2013.01); *G01N 29/348* (2013.01); *G01N 29/36* (2013.01);
(Continued)

(58) Field of Classification Search
CPC ...... G01B 17/02; G01N 29/348; G01N 29/36; G01N 2291/0234; G01N 2291/02854;
(Continued)

(56) References Cited

U.S. PATENT DOCUMENTS 3,906,791 A * 9/1975 Lynnworth ............... G01F 1/66
73/861.29
4,319,490 A     3/1982 Hartmann, Jr.
(Continued)

FOREIGN PATENT DOCUMENTS

JP     2003-139591     5/2003
KR     10-2026362     9/2019

OTHER PUBLICATIONS

Piao et al., Non-invasive ultrasonic inspection of sludge accumulation in a pipe, Ultrasonic, Sep. 29, 2021.
(Continued)

*Primary Examiner* — Tarun Sinha

(57) ABSTRACT

Disclosed is a measuring device for measuring the height of a foreign object in a pipe. The disclosed measuring device may include an ultrasonic transmitting unit disposed in the first region of the outer surface of the pipe through which the fluid passes inside thereof, and including an ultrasonic generator generating ultrasounds, a first transmission medium unit disposed between the ultrasonic generator and the first region, the first transmission medium unit, a second (Continued)

transmission medium unit disposed between the first transmission medium unit and the first area and contacting the first area, and a 1-1 ultrasound type conversion unit formed in the second transmission medium unit for converting the type of ultrasound received from the first transmission medium unit.

19 Claims, 18 Drawing Sheets

(52) U.S. Cl.
CPC ................ *G01N 2291/0234* (2013.01); *G01N 2291/02854* (2013.01); *G01N 2291/2634* (2013.01)

(58) Field of Classification Search
CPC ........... G01N 2291/2634; G01N 29/04; G01N 29/34; G01N 29/44; G01N 2291/042; G01N 2291/056
See application file for complete search history.

(56) References Cited

U.S. PATENT DOCUMENTS

| | | | | |
|---|---|---|---|---|
| 4,467,659 A | * | 8/1984 | Baumoel | ................. G01F 1/667 |
| | | | | 73/644 |
| 2021/0207985 A1 | * | 7/2021 | Kim | ......................... G01F 1/666 |

OTHER PUBLICATIONS

Piao et al., Ultrasonic flow measurement using a high-efficiency longitudinal-to-share wave mode-converting meta-slab wedge, Sensors and Actuators A: Physical. May 19, 2020, vol. 310. pp. 1-16.
International Search Report mailed Mar. 14, 2023 for PCT/KR2022/019511.

* cited by examiner

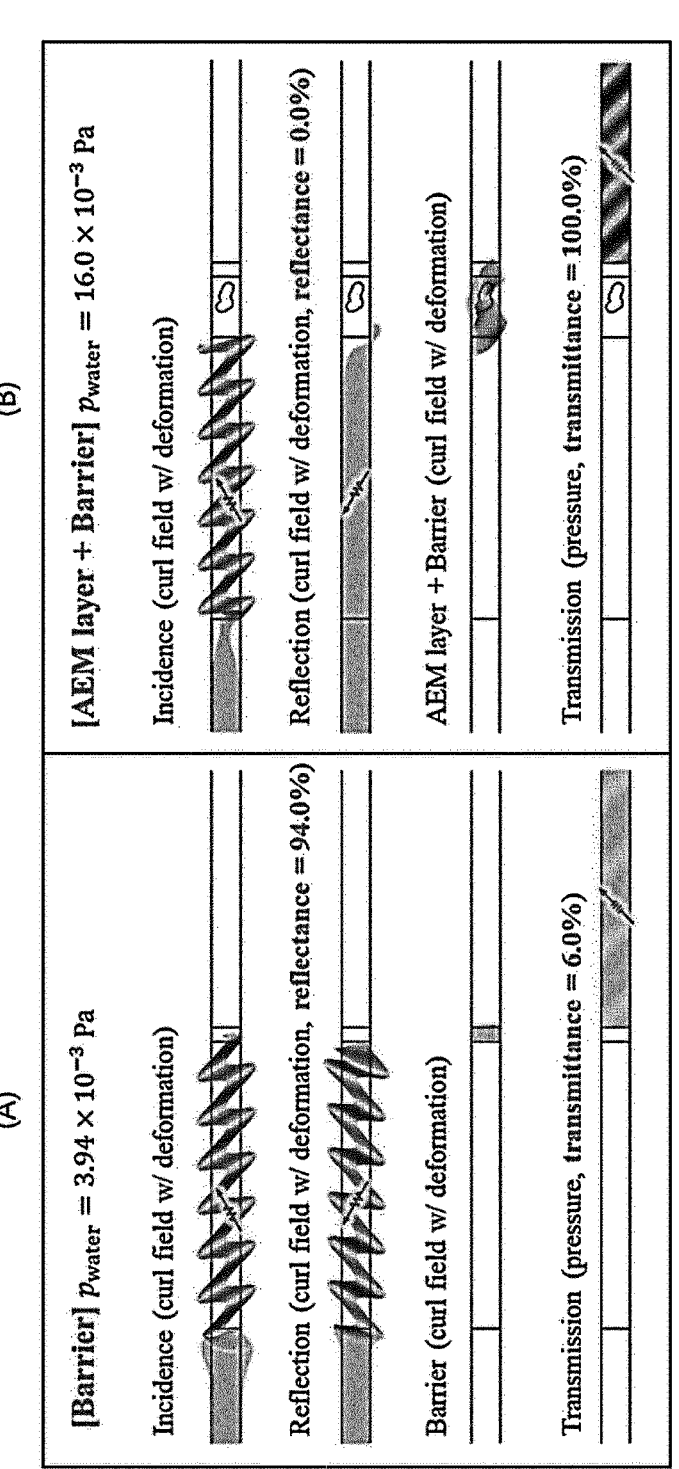

(A)

[Barrier] $p_{water} = 3.94 \times 10^{-3}$ Pa

Incidence (curl field w/ deformation)

Reflection (curl field w/ deformation, reflectance = 94.0%)

Barrier (curl field w/ deformation)

Transmission (pressure, transmittance = 6.0%)

(B)

[AEM layer + Barrier] $p_{water} = 16.0 \times 10^{-3}$ Pa

Incidence (curl field w/ deformation)

Reflection (curl field w/ deformation, reflectance = 0.0%)

AEM layer + Barrier (curl field w/ deformation)

Transmission (pressure, transmittance = 100.0%)

Pressure: ×4.06 amplification, Energy: ×16.5 amplification!

< Comparative example >

< Comparative example >

< Comparative example >

FIG. 11

< Comparative example >

FIG. 12 n12 p3 p2 p1 n13

< Comparative example >

< Comparative example >

MEASURING APPARATUS FOR MEASURING HEIGHT OF FOREIGN SUBSTANCE IN PIPE

This application claims the priority of Korean Patent Application No. 10-2022-0065130, filed on May 27, 2022 in the KIPO (Korean Intellectual Property Office), the disclosure of which is incorporated herein entirely by reference. Further, this application is the National Stage application of International Application No. PCT/KR2022/019511, filed on Dec. 2, 2022, which designates the United States and was published in Korean. Each of these applications is hereby incorporated by reference in their entirety into the present application.

TECHNICAL FIELD

The present invention relates to a device and method for detecting foreign substance in a pipe, and more particularly, to a measuring device and method for measuring the height of a foreign substance in a pipe.

BACKGROUND ART

When foreign substance such as sludge accumulates inside various pipes through which fluid passes, problems such as clogging of the pipes may occur. Therefore, it is necessary to detect foreign substances accumulated in the pipe and take appropriate measures therefor.

As the existing technologies for detecting foreign substances in pipes, there is a method for detecting foreign substances by using a guide wave propagating along the pipe or a method for measuring the thickness of foreign substances in the pipe by using sound waves generated by impacting the pipe. However, there are shortcomings as follows. When the guide wave is used, it is possible to measure only when the foreign substance in the pipe is in complete contact with the pipe, and since the magnitude of the signal varies depending on the type of foreign substance, it is difficult to accurately measure it. As the method of giving shock to the pipe may only be measured when the foreign substance in the pipe is in complete contact with the pipe, and it is a method of giving an impact, there is a problem that the joint between the pipe and the pipe or the pipe itself may be damaged during measurement.

In addition, according to the prior art, since the measurable height of the foreign substance in the pipe is quite high, there is a problem and limitation that it is difficult to detect or track and manage a small size or a small amount of foreign substance having a low height. In particular, with respect to a pipe made of a metal substance other than plastic, it is not easy to detect the foreign substance in the pipe itself due to the difference in impedance, and there is a problem that it is difficult to lower the measurable height of the foreign substance.

DISCLOSURE OF THE INVENTION

Technical Problem

The object to be achieved by the present invention is to provide a measuring device capable of measuring the height of a foreign substance in the pipe in a non-invasive manner for a pipe made of non-plastic substance (ex, metal, etc.), to easily measuring the height of the foreign substance regardless of the type of foreign substance, and greatly lowering the measurable height of foreign substances.

The problem to be solved by the present invention is not limited to the problems mentioned above, and other problems not mentioned will be understood by those skilled in the art from the description below.

Technical Solution

According to one embodiment of the present invention, there is provided a measuring device for measuring a height of foreign substance in a pipe comprising: an ultrasonic transmitting unit disposed in the first region of the outer surface of the pipe through which the fluid passes inside thereof and including an ultrasonic generator that generates ultrasounds, a first transmission medium unit disposed between the ultrasonic generator and the first region, the first transmission medium unit, a second transmission medium unit disposed between the first transmission medium unit and the first area and contacting the first area; and a 1-1 ultrasound type conversion unit formed in the second transmission medium unit for converting the type of ultrasound received from the first transmission medium unit; and an ultrasonic receiving unit disposed in the second region of the outer surface of the pipe, and including an ultrasonic receiver, a first reception medium unit disposed between the ultrasound receiver and the second region, a second reception medium unit disposed between the first reception medium unit and the second region and contacting the second region, and a 1-2 ultrasound type conversion unit formed in the second reception medium unit for converting the type of an ultrasound received from the second area.

The pipe may be made of metal, and the second transmission medium part and the second reception medium part may be made of metal.

The first transmission medium unit and the first reception medium unit may be formed of plastic, and the second transmission medium unit and the second reception medium unit may be formed of metal.

The plastic may include polyether ether ketone (PEEK).

The metal may include steel.

The ultrasound transmitting unit may have an assembly structure, and the second transmission medium unit in which the 1-1 ultrasound type conversion unit is formed may be detachably attached to the first transmission medium unit.

The ultrasound receiving unit may have an assembly type structure, and the second receiving medium unit in which the 1-2 ultrasound type conversion unit is formed may be configured to be detachable from the first receiving medium unit.

The 1-1 ultrasound mode conversion unit may be configured to convert an ultrasound of a transverse wave type into an ultrasound of a longitudinal wave type.

The 1-2 ultrasound type conversion unit may be configured to convert an ultrasound of a longitudinal type into an ultrasound of a transverse wave type.

At least one of the 1-1 ultrasonic mode conversion unit and the 1-2 ultrasonic mode conversion unit may include a meta-structure having a unit pattern structure.

The unit pattern structure may include a through-hole region formed in the second transmission medium unit or the second reception medium unit.

The ultrasonic generator may be configured to generate transverse wave type ultrasounds.

The ultrasonic generator may be configured to generate an ultrasound of a longitudinal wave type, and the measuring device is formed in the first transmission medium unit and may further include a 2-1 ultrasound type conversion unit for converting an ultrasound of a longitudinal wave type into an ultrasound of a transverse wave type; and a 2-2 ultra-sound type conversion unit formed in the first receiving medium unit and configured to convert an ultrasound of a transverse wave type into an ultrasound of a longitudinal wave type At least one of the 2-1 ultrasound type conversion unit and the 2-2 ultrasound type conversion unit may include a meta-structure having a unit pattern structure.

The unit pattern structure may include a through-hole region formed in the first transmission medium unit or the first reception medium unit.

The ultrasonic generator may be disposed to form an acute angle with respect to the second transmission medium unit, and the ultrasound receiver may be disposed to form an acute angle with respect to the second reception medium unit.

A first inclined surface may be formed in the first trans-mission medium unit, and the ultrasonic generator may be disposed on the first inclined surface.

A second inclined surface may be formed in the first reception medium unit, and the ultrasound receiver may be disposed on the second inclined surface.

Advantageous Effects

According to embodiments of the present invention, it is possible to measure the height of a foreign substance in a pipe in a non-invasive manner with respect to a pipe made of a non-plastic substance (e.g., metal, etc.), and to easily measure the height of the foreign substance regardless of the type of foreign substance. Furthermore, it is possible to implement a measuring device capable of greatly lowering the measurable height of foreign substance. If the measuring device according to the embodiments is used, it is possible to greatly improve the ultrasonic transmission characteris-tics of a pipe made of non-plastic substance (ex, metal, etc.), and also to reduce the impedance difference between the fluid in the pipe and the measuring device. As a result, the measurable height of the foreign substance may be greatly reduced, and the measuring angle range may be widened.

In addition, according to one embodiment of the present invention, as assembling and fastening are easily imple-mented by configuring the meta-slab and the medium part in a mutually detachable assembly structure in the measuring device, and the type of the meta-slab and the medium unit may be easily changed if necessary, the configuration/characteristics/conditions of the measuring device may be appropriately changed according to the actual conditions and conditions of usage.

According to this embodiment of the present invention, as various types of foreign substances in the pipe may be detected without impact or damage to the pipe, and foreign substances having a low height may be easily detected, and may be usefully applied for the maintenance and manage-ment of piping and facilities including it.

BRIEF DESCRIPTION OF THE DRAWINGS

FIG. 3 is a cross-sectional diagram for explaining trans-mission and reflection characteristics of ultrasounds in struc-tures according to comparative examples and embodiments.

FIG. 4 is a diagram illustrating simulation results obtained by evaluating reflection and transmission characteristics of ultrasounds in each structure corresponding to (A) and (B) of FIG. 3.

FIG. 11 is a graph illustrating the result obtained by evaluating foreign substance measurement performance in the pipe P1 by using a measuring device according to a comparative example.

FIG. 12 is a diagram illustrating the simulation results obtained by evaluating the minimum height of measurable foreign substances in the pipe by using the measuring device according to an embodiment of the present invention.

BEST MODE FOR CARRYING OUT THE INVENTION

Figure 1:
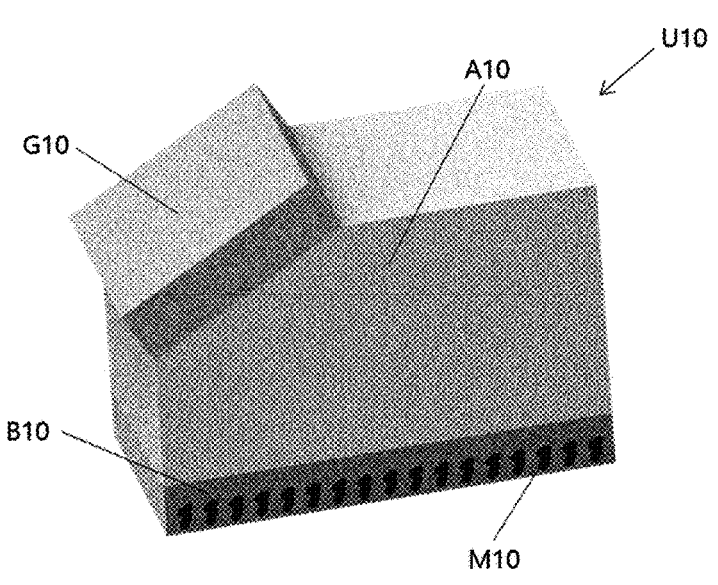
FIG. 1 and FIG. 2 are perspective diagrams illustrating an ultrasonic transmitting unit which may be applied to a measuring device for measuring the height of a foreign substance in a pipe according to an embodiment of the present invention.

Hereinafter, the embodiments of the present disclosure will be described in detail with reference to the accompanying drawings.

The embodiments of the present disclosure described below are provided to clearly explain the present invention to those having common knowledge in the related art, and the scope of the present invention is not limited by the following embodiments. The disclosed embodiments may be modified in many different forms.

The terminology used herein is used to describe specific embodiments, and is not used to limit the present invention. As used herein, terms in the singular form may include the plural form unless the context clearly dictates otherwise. Also, as used herein, the terms "comprise" and/or "comprising" specifies presence of the stated shape, step, number, action, member, element and/or group thereof; and does not exclude presence or addition of one or more other shapes, steps, numbers, actions, members, elements, and/or groups thereof. In addition, the term "connection" as used herein is a concept that includes not only that certain members are directly connected, but also a concept that other members are further interposed between the members to be indirectly connected.

In addition, in the present specification, when a member is said to be located "on" another member, this includes not only a case in which a member is in contact with another member but also a case in which another member is present between the two members. As used herein, the term "and/or" includes any one and any combination of one or more of those listed items. In addition, as used herein, terms such as "about", "substantially", etc. are used as a range of numerical value or degree, in consideration of inherent manufacturing and substance tolerances, or as a meaning close to the range. Furthermore, accurate or absolute numbers provided to aid the understanding of the present application are used to prevent an infringer from using the disclosed present invention unfairly.

A brief description of some technological terms used in this specification is as follows.

Meta substance: It is also called as a meta-structure. Meta substances are the substances engineered to have properties which do not exist in nature. A meta substance may be composed of a periodic array of engineered unit structures, and the properties of the meta substance may be determined by the structure. Extreme control of waves is possible by utilizing meta substances.

Elastic wave mode conversion: Elastic waves may be ultrasounds. Elastic wave mode conversion may also be referred to as elastic wave type conversion. It is a technology which utilizes a meta substance (anisotropic meta substance) to convert the wave mode of ultrasound propagating in an elastic medium from a longitudinal wave to a transverse wave or from a transverse wave to a longitudinal wave with an energy efficiency of about 90% or more or about 99% or more. It is possible to convert ultrasounds incident on the meta substance as longitudinal waves (or transverse waves) into transverse waves (or longitudinal waves) and to transmit them by engineering the unit structure of the meta substance and adjusting its anisotropy.

Full transmission of elastic waves: it means that ultrasounds entering the boundary between different elastic media are transmitted with 100% (or about 90% or more) energy efficiency without reflection by utilizing meta substances (anisotropic meta substances). It is possible to maximize the transmittance of ultrasound (both longitudinal and transverse waves) at the boundary between different media by engineering the unit structure of the meta substance, so that the phase matching condition and the impedance matching condition may be matched.

Snell's law: When two different media are in contact, and the elastic waves pass through the two media, as the velocity of sound is different for each medium ($v_1$ and $\theta_2$, respectively), angle of transmission is different. If angle of incidence and angle of transmission are expressed as an angle in a plane of incidence, they become $\theta_1$ and $\theta_2$, respectively. At this time, Snell's law is defined as Equation 1 below.

$$\frac{\sin\theta_1}{\sin\theta_2} = \frac{v_1}{v_2} \qquad \text{[Equation 1]}$$

Hereinafter, embodiments of the present invention will be described in detail with reference to the accompanying drawings. A size or a thickness of areas or parts shown in the accompanying drawings may be slightly exaggerated for clarity of the specification and convenience of description. The same reference numbers indicate the same elements throughout the detailed description.

Figure 2:
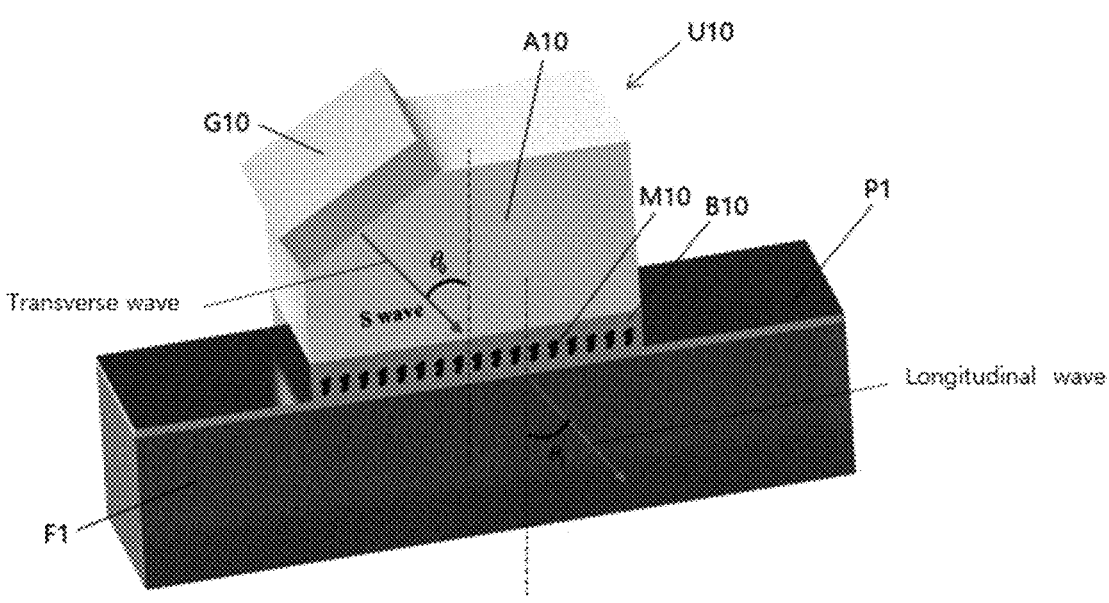

FIG. 1 and FIG. 2 are perspective diagrams illustrating an ultrasound transmitting unit U10 which may be applied to a measuring device for measuring the height of a foreign substance in a pipe according to an embodiment of the present invention. FIG. 1 shows the ultrasound transmitting unit U10, FIG. 2 shows the case where the ultrasound transmitting unit U10 is applied to the pipe P1 in an example.

Referring to FIGS. 1 and 2, the measuring device for measuring the height of a foreign substance in a pipe according to an embodiment of the present invention may include an ultrasound transmitting unit U10. The ultrasound transmitting unit U10 may be disposed in the first area of the outer surface of the pipe P1 through which the fluid F1 passes. For convenience, only a portion of the pipe P1 is shown, but in reality, it may have a cylindrical structure (a pipe structure). Here, the pipe P1 may be formed of a non-plastic substance, for example, a metal substance. For example, the pipe P1 may be a steel pipe. The fluid F1 may be, for example, water, but may also be other liquids.

The ultrasound transmitting unit U10 may include an ultrasonic generator G10 generating ultrasounds, a first transmission medium unit A10 disposed between the ultrasonic generator G10 and a first area of the pipe P1, a second transmission medium unit B10 contacting the first area and disposed between the first transmission medium unit A10, and an ultrasound type conversion unit M10 formed in the second transmission medium unit B10 for converting the type of ultrasound received from the first transmission medium unit A10.

The ultrasonic generator G10 may serve to convert electrical signals into ultrasound signals. The ultrasonic generator G10 may be or include an ultrasound transducer for transmission. The ultrasonic generator G10 may include a piezoelectric element for converting an electrical signal into an ultrasound signal. In one example, as a non-limiting example, the piezoelectric element may include, for example, oxides or compounds such as barium (Ba), calcium (Ca), titanium (Ti), zirconium (Zr), manganese (Mn), and a piezoelectric substance such as a PZT (lead zirconate titanate) substance between electrodes facing each other, which may have a single layer structure or may be multilayered by alternating the electrodes, and may also have a three-dimensional shape through a thin film or MEMS (micro-electromechanical system) technology. In this embodiment, the ultrasonic generator G10 may be an element generating ultrasounds of a transverse wave type. In this specification, the term 'transverse wave' may refer to 'transverse wave' or 'transverse wave' or transverse wave.

The first transmission medium unit A10 and the second transmission medium unit B10 may be made of different substances. The first transmission medium unit A10 may be made of plastic, and the second transmission medium unit B10 may be made of metal. When the first transmission medium unit A10 is made of plastic, the plastic may include, for example, polyether ether ketone (PEEK). However, depending on the case, the type of the plastic may be variously changed. When the second transmission medium B10 is formed of metal, the metal may include, for example, steel. The second transmission medium unit B10 may be made of the same substance as the pipe P1 and may come into contact (direct contact) with the pipe P1. Each of the first transmission medium unit A10 and the second transmission medium unit B10 may have a kind of wedge structure. Accordingly, the first transmission medium unit A10 may be a plastic wedge unit, and the second transmission medium unit B10 may be a metal wedge unit. The thickness of the second transmission medium unit B10 may be thinner than that of the first transmission medium unit A10. The thickness of the second transmission medium unit B10 varies in design depending on the thickness of the pipe and the internal fluid, and may be, for example, about 5 to 10 mm, but the present application is not limited thereto.

The second transmission medium unit B10 may include a 1-1 ultrasound type conversion unit M10 for converting the type of ultrasound received from the first transmission medium unit A10. The 1-1 ultrasound type conversion unit M10 may be referred to as a '1-1 ultrasonic mode conversion unit'. The 1-1 ultrasound type conversion unit M10 may be configured to convert ultrasound of a transverse wave type into an ultrasound of a longitudinal wave type. Here, the longitudinal wave may be referred to as a tensile wave.

In one embodiment, the 1-1 ultrasonic type conversion unit M10 may include a meta structure having a unit pattern structure for mode (type) conversion of ultrasound. The meta-structure may be referred to as a kind of meta substance, and mode conversion of ultrasounds may be induced through a substance configuration through a geometric structure without electrical conversion. The second transmission medium unit B10 in which the 1-1 ultrasound type conversion unit M10 is formed may be referred to as a kind of meta-slab. The meta-slab may be designed by considering the thickness of the pipe P1. Therefore, the second transmission medium unit B10, the 1-1 ultrasound type conversion unit M10, and the first part corresponding to the first area of the pipe P1 in which they are placed are combined may be called as meta-slab structure.

The 1-1 ultrasound type conversion unit M10 may be designed in a predetermined shape so that its operating frequency may match the natural frequency of the ultrasonic generator G10. The 1-1 ultrasound type conversion unit M10 may include an array of unit pattern structures, and in this specification, the unit pattern structure may include a through-hole area formed in the second transmission medium unit B10. The through-hole area may be easily formed by drilling a hole in the second transmission medium unit B10 according to a processing method such as wire cutting or laser cutting. The through-hole area may be an empty area, but may be filled with a substance different from that of the second transmission medium unit B10 in some cases.

In one embodiment, the ultrasonic generator G10 may be disposed to form an acute angle (an inner angle) with respect to the second transmission medium unit B10. To this end, a first inclined surface may be formed at a corner area of one side of the first transmission medium unit A10, and an ultrasonic generator G10 may be disposed on the first inclined surface. The ultrasounds of a transverse wave type generated in the ultrasonic generator G10 may pass through the first transmission medium A10 in a direction perpendicular to the ultrasonic generator G10. The transverse wave type ultrasound propagating in the first transmission medium unit A10 is obliquely incident to the second transmission medium unit B10, passes through the 1-1 ultrasound type conversion unit M10, and is almost completely mode (type)—converted into an ultrasound of a longitudinal wave type and may be transmitted through the fluid F1. M10 (or the meta-slab including the same) may play a role to completely transmit (almost completely transmits) the ultrasound into the fluid F1 while mode-converting ultrasound of a transverse wave type into an ultrasound of a longitudinal wave type.

Figure 3:
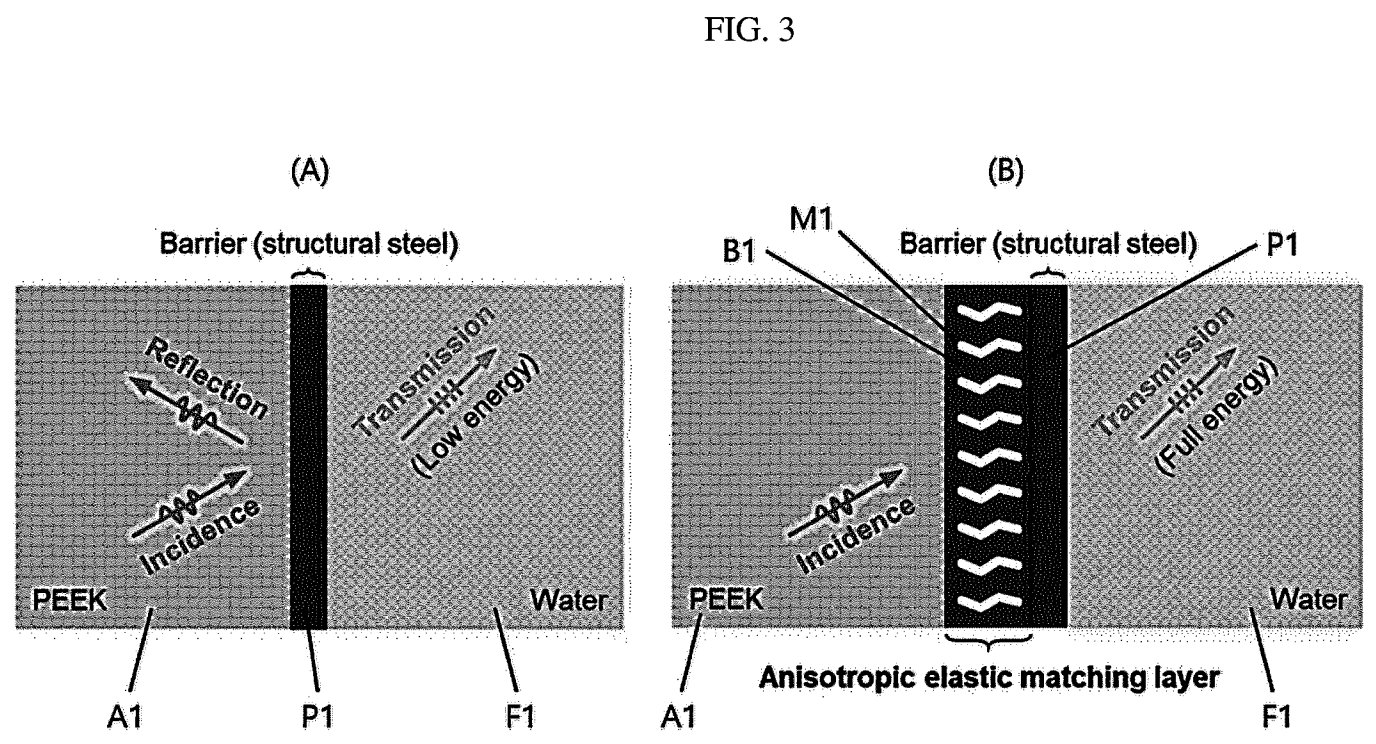

FIG. 3 is a cross-sectional diagram for explaining transmission and reflection characteristics of ultrasounds in structures according to comparative examples and embodiments.

In (A) of FIG. 3 is a structure according to a comparative example, and (B) is a structure according to an embodiment. In (A) of FIG. 3, the plastic wedge portion A1 is in direct contact with the metal pipe P1, and in (B) of FIG. 3, a metal wedge portion B1 including a 1-1 ultrasound type conversion unit M1 is disposed between the plastic wedge portion A1 and the metal pipe P1.

In (B) of FIG. 3, the plastic wedge part A1, the metal wedge part B1, and the 1-1 ultrasound type conversion unit M1 may correspond to the first transmission medium unit A10, the second transmission medium unit B10, and the 1-1 ultrasound type conversion unit M10 of FIG. 2, respectively. The meta-slab including the 1-1 ultrasound type conversion unit M1 and the metal wedge unit B1 may be designed in consideration of the thickness of the metal pipe P1. The metal wedge portion B1 on which the 1-1-th ultrasound type conversion unit M1 is formed may be referred to as an anisotropic elastic matching layer (i.e., an AEM layer). The cross section of the unit pattern structure of the 1-1 ultrasound type conversion unit M10 may have a bar shape (i.e., or a shape similar thereto) which has been bent twice. The twice-bent bar shape may be referred to as a similar Z-shape or a modified shape therefrom. The shape of the unit pattern structure may be variously changed.

Referring to (A) of FIG. 3, when ultrasounds are transmitted from the plastic wedge portion A1 to the fluid F1 through the metal pipe P1, as unwanted reflected ultrasounds are inevitably generated, the energy ratio of ultrasounds transmitted to the fluid F1 is very low.

Referring to (B) of FIG. 3, the 1-1 ultrasound type conversion unit M1 mode-converts the ultrasound of transverse wave type propagating in the plastic wedge unit A1 into an ultrasound of a longitudinal wave type, so that it may play a role in permeating the fluid F1 with energy efficiency close to 100%. The waves incident from the plastic wedge portion A1 may be both transverse waves and longitudinal waves, but in the embodiment of the present invention, the case of incident transverse waves having a wider refraction angle range of ultrasounds has been described as an example.

FIG. 4 is a diagram illustrating simulation results obtained by evaluating reflection and transmission characteristics of ultrasounds in each structure corresponding to (A) and (B) of FIG. 3. (A) of FIG. 4 is the result of the (A) structure of FIG. 3 corresponding to the comparative example, (B) of FIG. 4 is the result of the (B) structure of FIG. 3 corresponding to the embodiment. Angle of incidence of the transverse wave incident from the plastic wedge portion may be freely set, and in the embodiment of the present invention, a case where angle of incidence of the transverse wave is 30° will be described as an example.

Referring to FIG. 4, in general, when a wave enters the boundary of a medium, reflection inevitably occurs and only a part of the wave is transmitted. By elaborately designing through the lens, almost all energy may be transmitted without reflection. In an embodiment of the present invention, almost all energy may be transmitted without reflection by precisely designing the shape and the size of the pattern of the 1-1 ultrasound type conversion unit through an optimization technique. As a result of reviewing the simulation results, in the case of no meta-slab (A), the ratio of reflected ultrasounds is calculated as 94% and the ratio of transmitted ultrasounds is calculated as 6%, and the pressure amplitude in the fluid (water) is calculated as 3.94 mPa. However, as in the embodiment of the present invention, when the elaborately designed meta-slab is used (B), the ratio of reflected ultrasounds is calculated as 0% and the ratio of transmitted ultrasounds is calculated as 100%, and the pressure amplitude in the fluid (water) is calculated as 16.0 mPa. That is, when using the meta-slab ultrasound transducer according to an exemplary embodiment of the present invention, the ultrasonic transmission pressure amplitude in the fluid (water) may be amplified by 4.06 times and the ultrasonic transmission energy in the fluid (water) may be amplified by about 16.5 times.

Figure 5:
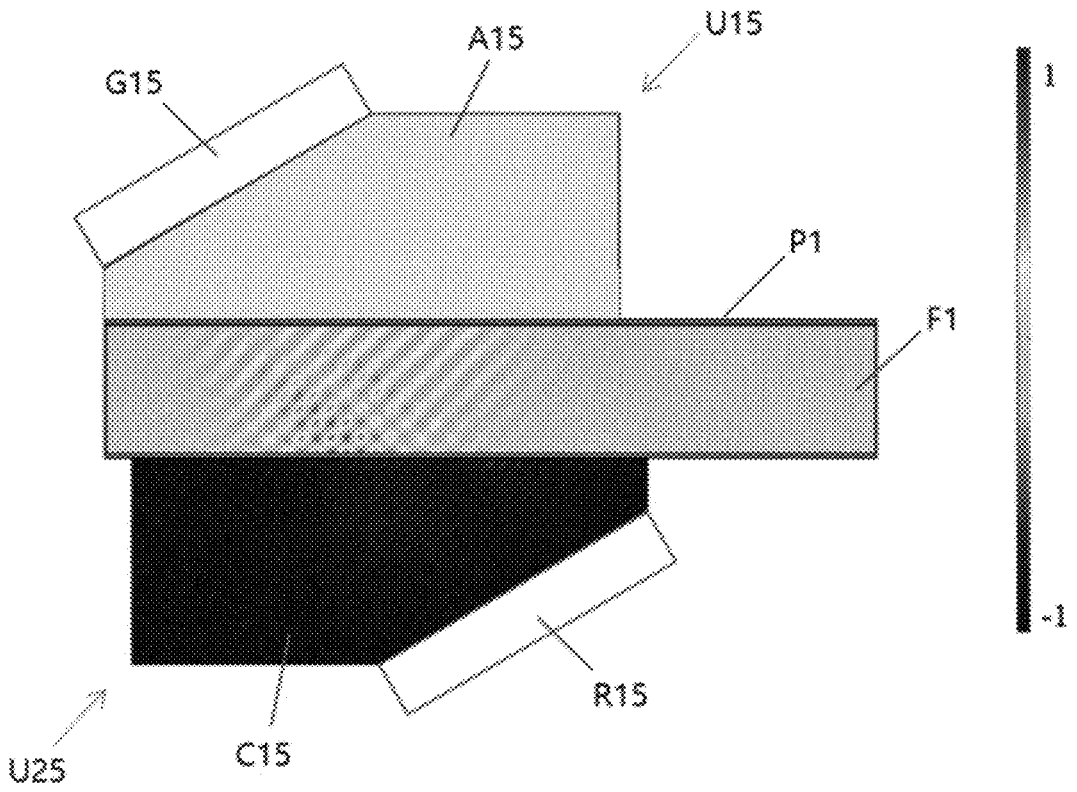
FIG. 5 is a cross-sectional diagram illustrating a measur-ing device for detecting foreign substances in a pipe accord-ing to a comparative example.

FIG. 5 is a cross-sectional diagram illustrating a measuring device for detecting foreign substances in a pipe according to a comparative example.

Referring to FIG. 5, the measuring device according to the comparative example includes an ultrasound transmitting unit U15 disposed in a first area of a pipe P1 through which a fluid F1 flows and an ultrasounds receiving unit U25 disposed in a second area of the pipe P1. The ultrasound transmitting unit U15 has an ultrasonic generator G15 and a transmission medium portion A15 disposed between the ultrasonic generator G15 and the first area of the pipe P1. The ultrasonic receiving unit U25 has an ultrasound receiver R15 and a receiving medium part C15 disposed between the ultrasound receiver R15 and the second area of the pipe P1. The ultrasonic generator G15 may be an element which generates ultrasound of transverse wave type. The pipe P1 may be a metal pipe, and the transmission medium unit A15 and the receiving medium unit C15 are made of plastic. The measuring device according to the comparative example is different from the measuring device according to the embodiment of the present invention in that it does not include a meta-slab including an ultrasound type conversion unit.

In connection with the measuring device according to the comparative example described with reference to FIG. 5, a simulation was performed by using COMSOL Multiphysics, a commercial program in order to evaluate transmittance. In the simulation, the incident angle ($\theta_0$) was set to 30°. The ultrasound may travel as a transverse wave within the transmission medium unit A15, travel as a longitudinal wave within the fluid F1 due to the characteristics of the fluid F1, and may proceed as a transverse wave again in the receiving medium unit C15.

Figure 6:
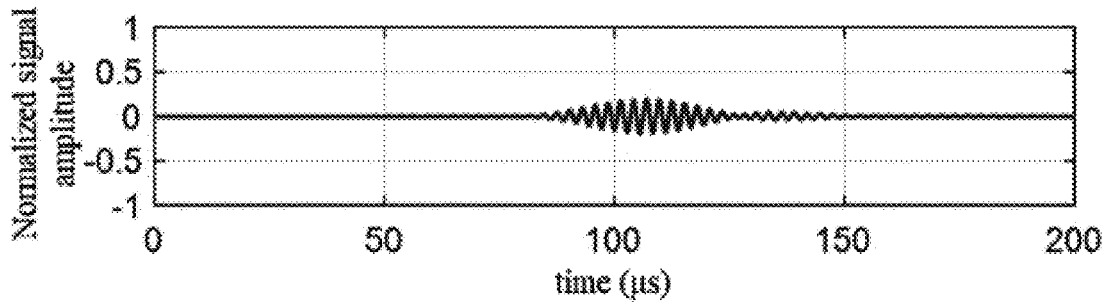
FIG. 6 is a graph illustrating results obtained by measur-ing an ultrasound signal detected in an ultrasound receiver after passing through a fluid when measurement is per-formed using a measuring device according to a comparative example as shown in FIG. 5.

FIG. 6 is a graph illustrating a result obtained by measuring an ultrasound signal detected by the ultrasound receiver R15 after passing through the fluid F1 when measurement is performed by using the measuring device according to the comparative example as shown in FIG. 5.

Referring to FIG. 6, when the measuring device according to the comparative example, the ultrasound generated by the ultrasonic generator G15 is transmitted through the fluid F1 and then detected in the ultrasound receiver R15 on the other side, but at this time, t may be seen that the amplitude of the ultrasound signal obtained in the ultrasound receiver R15 I is very low.

When the plastic wedge part and the metal pipe are in contact with each other, a sound speed difference between the plastic wedge part and the metal pipe may be very large, and accordingly, an impedance difference may also be very large. Here, the impedance value corresponds to the product of sound velocity and density. When the plastic wedge part and the metal pipe are in direct contact state, energy loss may be very large at the interface between them. In addition, since an interface exists between the metal pipe and the fluid (water), and a difference in sound velocity and impedance of ultrasounds between the metal pipe and the fluid are also remarkably large, energy loss may be large even at the interface. Therefore, a lot of energy may be lost when ultrasounds reach the fluid from the plastic wedge, and as a result, transmittance may be very low.

Figure 7:
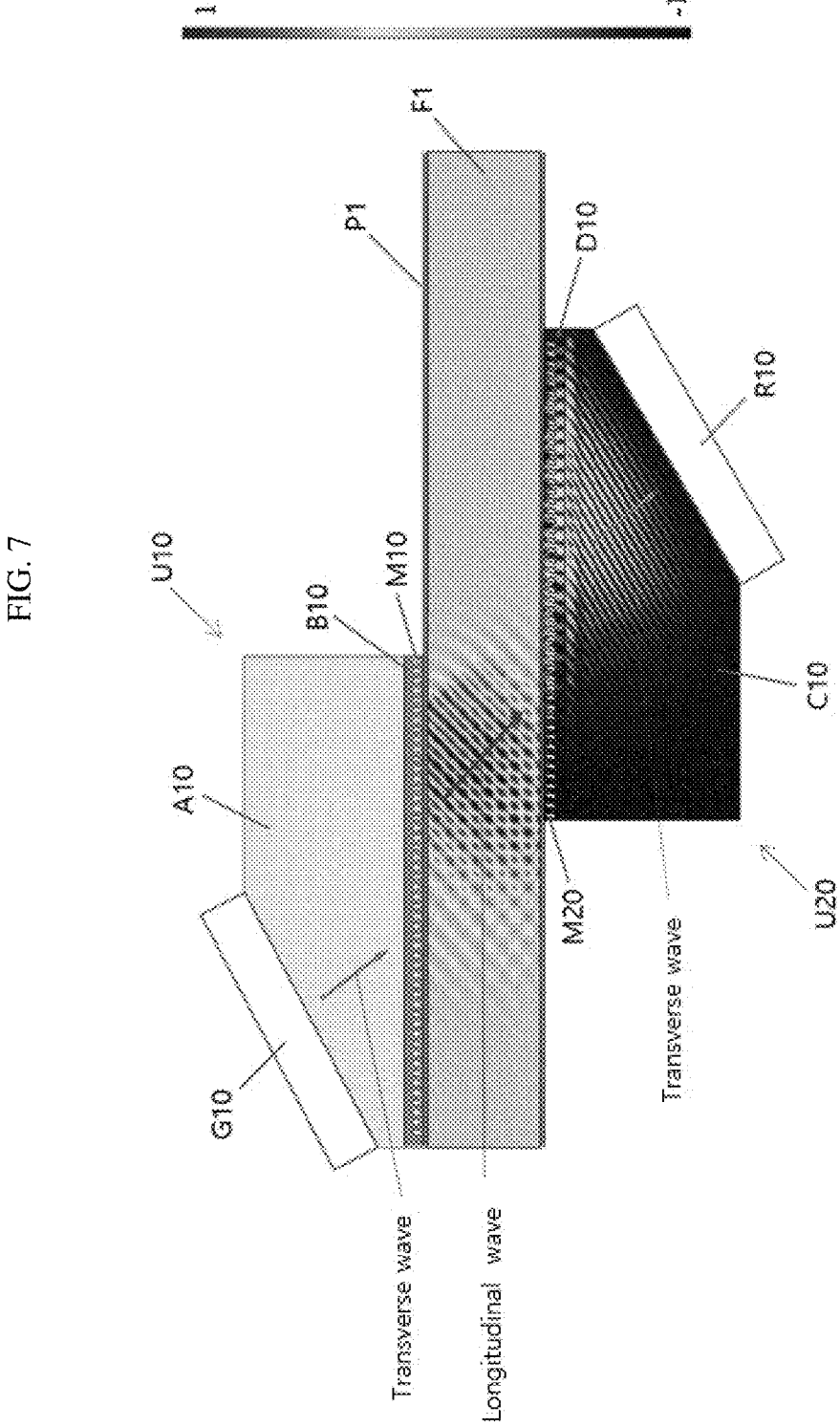
FIG. 7 is a cross-sectional diagram illustrating a measur-ing device for measuring the height of foreign substances in a pipe according to an embodiment of the present invention.

FIG. 7 is a cross-sectional diagram illustrating a measuring device for measuring the height of foreign substances in a pipe according to an embodiment of the present invention.

Referring to FIG. 7, the measuring device according to the embodiment may include an ultrasound transmitting unit U10 disposed in a first area of an outer surface of a pipe P1 through which a fluid F1 flows, and a second area of the outer surface of the pipe P1, and an ultrasound receiving unit U20 disposed in the second area. The pipe P1 may be formed of a non-plastic substance, for example, a metal substance. For example, the pipe P1 may be a steel pipe.

The ultrasound transmitting unit U10 may include an ultrasonic generator G10 generating ultrasounds, a first transmission medium A10 disposed between the ultrasonic generator G10 and the first area of the pipe P1, a second transmission medium unit B10 disposed between the first transmission medium unit A10 and the first area and contacting the first area; and a 1-1 ultrasound type conversion unit M10 formed in the second transmission medium unit B10 for converting the type of ultrasounds received from the first transmission medium unit A10. The 1-1 ultrasound type conversion unit M10 may serve to convert ultrasound of transverse wave type into an ultrasound of a longitudinal wave type and transmit them through the fluid F1. A specific configuration of the ultrasound transmitting unit U10 may be the same as or similar to that described with reference to FIGS. 1 and 2.

The ultrasonic receiving unit U20 may include an ultrasound receiver R10, a first receiving medium part C10 disposed between the ultrasound receiver R10 and the second area of the pipe P1, the second receiving medium unit D10 disposed between the first receiving medium unit C10 and the second area and contacting the second area, and a 1-2 ultrasound type conversion unit M20 formed in the second receiving medium unit D10 for converting the type of ultrasound received from the second area.

The ultrasound receiver R10 may receive ultrasounds transmitted through the receiving medium units C10 and D10. The ultrasound receiver R10 may serve to convert ultrasound signals into electrical signals. The ultrasound receiver R10 may be or include an ultrasound transducer for reception. The ultrasound receiver R10 may include a piezoelectric element for converting an ultrasound signal into an electrical signal. For example, the piezoelectric element may be composed of various substances from PZT substance as described above, or may have any shape. In this embodiment, the ultrasound receiver R10 may be an element configured to receive ultrasounds of a transverse wave type.

The first receiving medium unit C10 and the second receiving medium unit D10 may be made of different substances. The first receiving medium unit C10 may be made of plastic, and the second receiving medium unit D10 may be made of metal. When the first receiving medium C10 is made of plastic, the plastic may include polyether ether ketone (PEEK), for example. However, depending on the case, the type of the plastic may be variously changed. When the second receiving medium D10 is made of metal, the metal may include, for example, steel. The second receiving medium unit D10 may be made of the same substance as the pipe P1 and may come into contact (direct contact) with the pipe P1. Each of the first receiving medium unit C10 and the second receiving medium unit D10 may have a kind of wedge structure. Accordingly, the first receiving medium unit C10 may be a plastic wedge unit, and the second receiving medium unit D10 may be a metal wedge unit. The thickness of the second receiving medium unit D10 may be smaller than that of the first receiving medium unit C10. The thickness of the second receiving medium unit D10 varies in design depending on the thickness of the pipe and the internal fluid, and may be, for example, about 5 to 10 mm, but the present application is not limited thereto.

The second receiving medium unit D10 may include a 1-2 ultrasound type conversion unit M20 for converting the type of ultrasound received from the second area of the pipe P1. The 1-2 ultrasound type conversion unit M20 may be referred to as a '1-2 ultrasound mode conversion unit'. The 1-2 ultrasound type conversion unit M20 may be configured to convert an ultrasound of a longitudinal wave type into an ultrasound of a transverse wave type.

In one embodiment, the 1-2 ultrasound type conversion unit M20 may include a meta-structure having a unit pattern structure for mode (type) conversion of ultrasound. The meta-structure may be referred to as a kind of meta substance, and mode conversion of ultrasounds may be induced through a substance configuration having a geometric structure without electrical conversion. The second receiving medium unit D10 in which the 1-2 ultrasound type conversion unit M20 is formed may be referred to as a kind of meta-slab. The meta-slab may be designed in consideration of the thickness of the pipe P1. Therefore, a structure including all of the second receiving medium unit D10, the 1-2 ultrasound type conversion unit M20, and the second part corresponding to the second area of the pipe P1 in which they are placed may be called as a meta-slab structure.

The 1-2 ultrasound type conversion unit M20 may include an array of unit pattern structures, and the unit pattern structure may include a through-hole area formed in the second receiving medium unit D10. The through-hole area may be easily formed in a manner of making a hole in the second receiving medium D10 by using a processing method such as wire cutting or laser cutting. The through-hole area may be an empty area, but may be filled with a substance different from that of the second receiving medium unit D10 in some cases.

In one embodiment, the ultrasound receiver R10 may be disposed to form an acute angle (an inner angle) with respect to the second receiving medium unit D10. To this end, a second inclined surface may be formed at a corner area of one side of the first receiving medium C10, and the ultrasound receiver R10 may be disposed on the second inclined surface. The ultrasounds transmitted from the fluid F1 to the longitudinal wave type are almost completely mode-converted into ultrasounds of a transverse wave type by the 1-2 ultrasound type conversion unit M20 and may be incident to the ultrasound receiver R10.

In connection with the measuring device according to the embodiment as described in FIG. 7, a simulation was performed using COMSOL Multiphysics, a commercial program in order to evaluate transmittance. In the simulation, the incident angle (00) was set to 30°.

Figure 8:
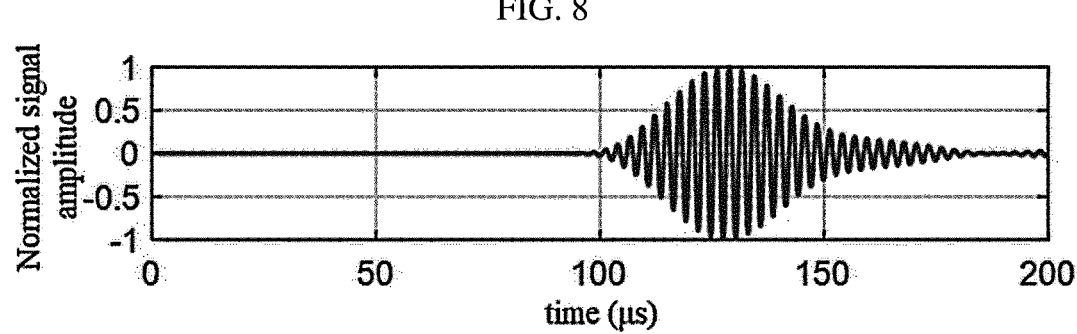
FIG. 8 is a graph illustrating the results obtained by measuring the ultrasound signal detected by the ultrasound receiver after passing through the fluid when the measure-ment is performed using the measuring device according to the embodiment as described in FIG. 7.

FIG. 8 is a graph illustrating the results obtained by measuring the ultrasound signal detected by the ultrasound receiver R10 after passing through the fluid F1 when the measurement is performed using the measuring device according to the embodiment as described in FIG. 7.

Referring to FIG. 8, in the case of the measuring device according to the embodiment, it may be confirmed that the amplitude of the ultrasound signal detected by the ultrasound receiver R10 is about 5.3 times higher than the result of FIG. 6 according to the comparative example. As may be seen from these simulation results, if the meta-slab ultrasound transducer according to the embodiment of the present invention is used, ultrasounds may be easily transmitted with very high energy efficiency, and foreign substances (obstacles) may be detected in a wider angular range inside the fluid in the structure.

In the embodiment of the present invention, the difference in sound velocity and impedance between the first transmission medium unit A10 and the fluid F1 may be greatly reduced by providing the 1-1 ultrasound type conversion unit M10 in the second transmission medium unit B10 formed of the same or similar substance as the pipe P1, and as a result, the ultrasound transmittance between them may be greatly improved. In addition, in the embodiment of the present invention, the difference in sound velocity and impedance may greatly reduce between the first receiving medium unit C10 and the fluid F1 by providing the 1-2 ultrasound type conversion unit M20 in the second receiving medium unit D10 formed of the same or similar substance as the pipe P1, and as a result, the ultrasound transmittance between them may be greatly improved.

Figure 9:
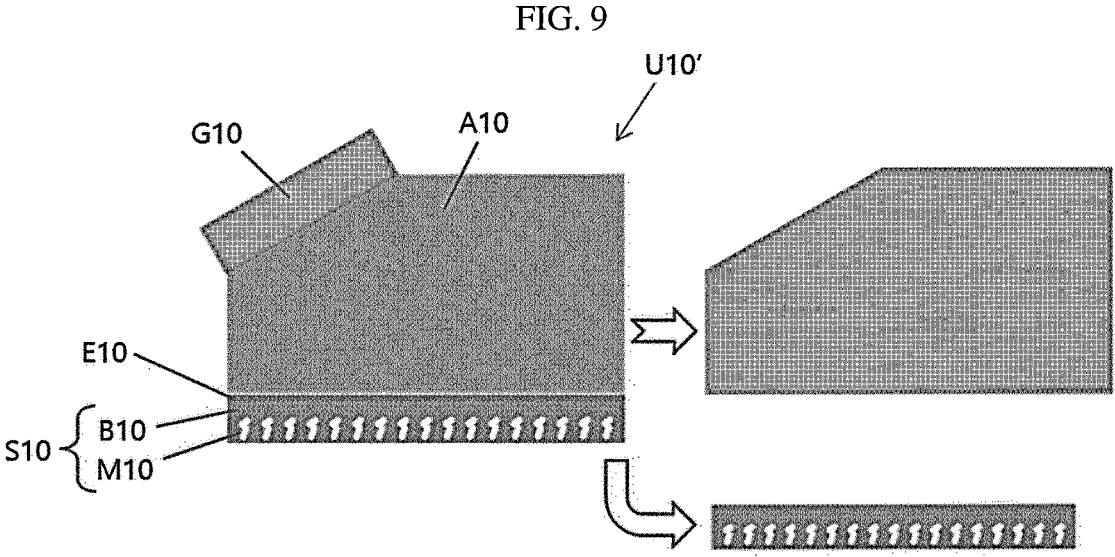
FIG. 9 is a cross-sectional diagram illustrating an ultra-sound transmitting unit which may be applied to a measur-ing device for measuring the height of a foreign substance in a pipe according to an embodiment of the present invention.

FIG. 9 is a cross-sectional diagram illustrating an ultrasound transmitting unit U10' which may be applied to a measuring device for measuring the height of a foreign substance in a pipe according to an embodiment of the present invention.

Referring to FIG. 9, the ultrasound transmitting unit U10' may have a prefabricated structure. That is, the second transmission medium unit B10 in which the 1-1 ultrasound type conversion unit M10 is formed may be detachably attached to the first transmission medium unit A10. Here, the second transmission medium unit B10 in which the 1-1 ultrasound type conversion unit M10 is formed may be referred to as a kind of meta-slab S10. The fastening (coupling) method between the first transmission medium unit A10 and the meta-slab S10 may be varied. For example, the first transmission medium unit A10 and the meta-slab S10 may be coupled by various fastening methods such as adhesives or bolts/screws. Here, although a case in which a predetermined coupling layer E10 is interposed between the first transmission medium unit A10 and the meta-slab S10 is shown, this is merely exemplary, and the coupling layer E10 may be changed into a different coupling structure.

In this way, when the meta-slab S10 and the first transmission medium unit A10 are configured as a structure of a mutually detachable assembly type in the measuring device according to the embodiment of the present invention, it is not only easy to assemble and fasten, but also the types of the meta-slab S10 and the first transmission medium unit A10 may be easily changed if necessary. Thus, the configuration/characteristics/conditions of the measurement device may be appropriately changed according to actual usage conditions and situations.

According to one embodiment of the present invention, the substance of the plastic wedge part and the metal wedge part of the ultrasonic transmitting unit may be selected according to the substance/physical properties of the pipe and the fluid. The shape/structure of the meta-slab may be optimized and designed according to the natural frequency of the ultrasonic generator, the substance of the plastic wedge part and the metal wedge part, and the substance/physical properties of the pipe and fluid. In one embodiment of the present invention, the fastening method between the plastic wedge part and the metal wedge part may be selected from various methods such as adhesive bonding and bolt fastening, and the plastic wedge part and the metal wedge part may be separated according to actual conditions of use, may be used while being combined with other models.

Also, according to an embodiment of the present invention, the ultrasonic receiving unit (U20 in FIG. 7) may have a prefabricated structure. That is, the second reception medium unit (D10 in FIG. 7) formed with the 1-2 ultrasound type conversion unit (M20 in FIG. 7) may be configured as a structure in which is detached from the first reception medium unit (C10 in FIG. 7). Here, the second receiving medium D10 in which the 1-2 ultrasound type conversion unit M20 is formed may be referred to as a kind of meta-slab (second meta-slab). When the ultrasonic receiving unit U20 has a fabricated structure, its specific configuration and effects thereof may be the same as or similar to those described for the ultrasonic transmitting unit U10' in FIG. 9.

Figure 10:
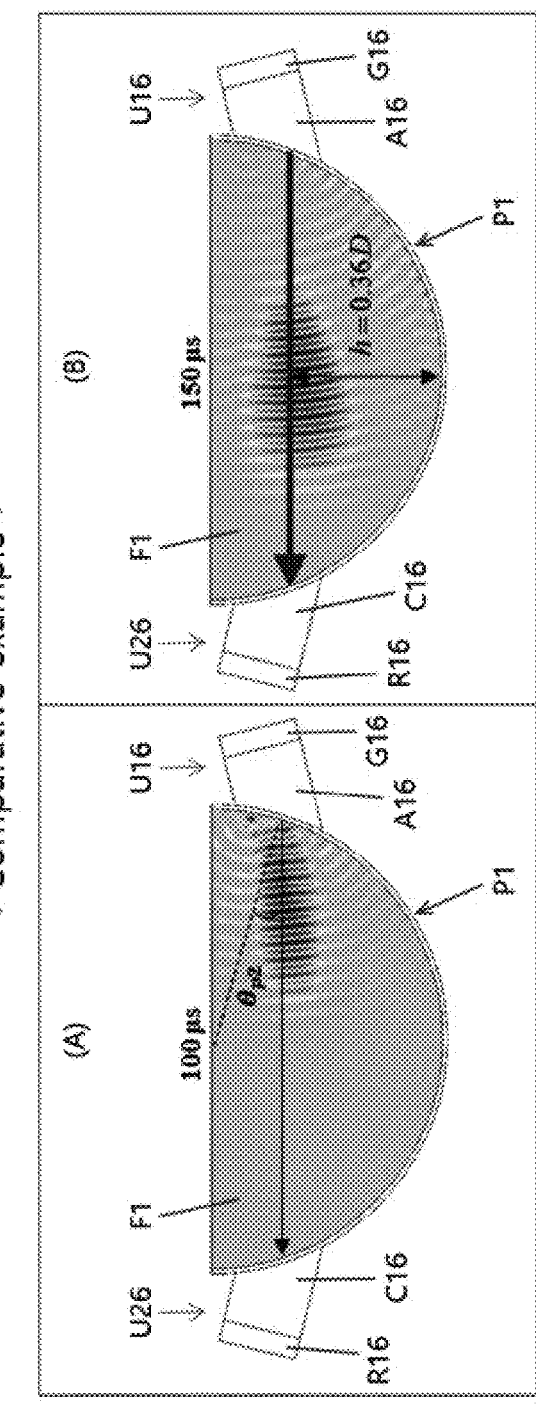
FIG. 10 is a diagram illustrating simulation results obtained by evaluating the measurable minimum height of foreign substances in a pipe by using a measuring device according to a comparative example.

FIG. 10 is a diagram illustrating simulation results obtained by evaluating the minimum height of measurable foreign substances in the pipe P1 using a measuring device according to a comparative example.

Referring to FIG. 10, the measuring device according to the comparative example includes an ultrasonic transmitting unit U16 and an ultrasound receiving unit U26, and the ultrasonic transmitting unit U16 includes an ultrasonic generator G16 and a transmission medium unit A16. The ultrasonic receiving unit U26 has an ultrasound receiver R16 and a receiving medium unit C16. It may be mentioned that the measuring device according to the comparative example has a configuration similar to that of the measuring device according to the comparative example described in FIG. 5.

In connection with the measuring device according to the comparative example of FIG. 10, a simulation was performed by using COMSOL Multiphysics, a commercial program. The pipe P1 used in the simulation had an outer diameter (D) of 200 mm, and a thickness (t) of 2 mm, and was made of a substance of steel.

Figure 11:
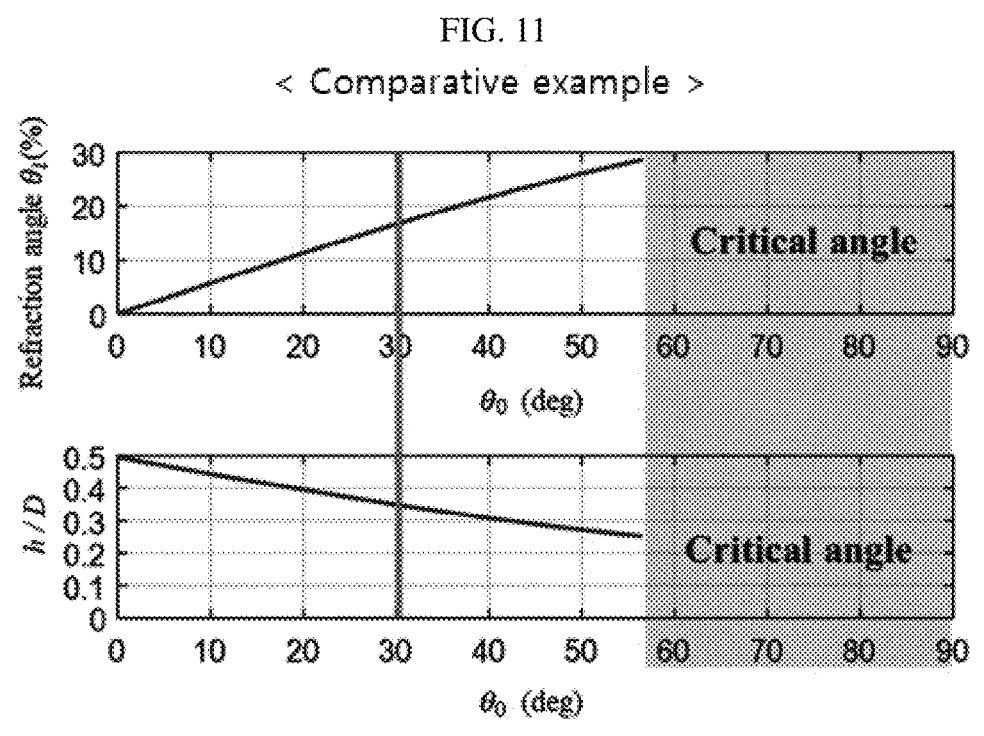

FIG. 11 is a graph illustrating the result obtained by evaluating foreign substance measurement performance in the pipe P1 by using a measuring device according to a comparative example.

Referring to the results of FIGS. 10 and 11, when the incident angle (θ0) is 30° in the measuring device according to the comparative example, the refraction angle θ1 in the fluid (here, water) is 17° according to Snell's law, and the measurable minimum height (h) of a foreign substance was 0.36D. When the incident angle (θ0) condition is changed, the minimum height (h) of the measurable foreign substance of the measuring device according to the comparative example.

The sound speed of the transverse wave in the transmission medium part A16 corresponding to the plastic (PEEK) wedge part may be about 1070 m/s, and the sound speed of the transverse wave in the pipe P1 made of steel may be about 3120 m/s. The sound speed of the longitudinal wave in the fluid F1 corresponding to water may be about 1500 m/s. Therefore, the difference between the sound speed of the transverse wave in the pipe P1 made of steel and the sound speed of the longitudinal wave in the fluid F1 may be very large, and the refraction angle of an ultrasound may be small when the ultrasound is incident to the fluid F1. Therefore, as a result, the minimum measurable height of the foreign substance in the measuring device according to the comparative example may be remarkably increased.

Figure 12:
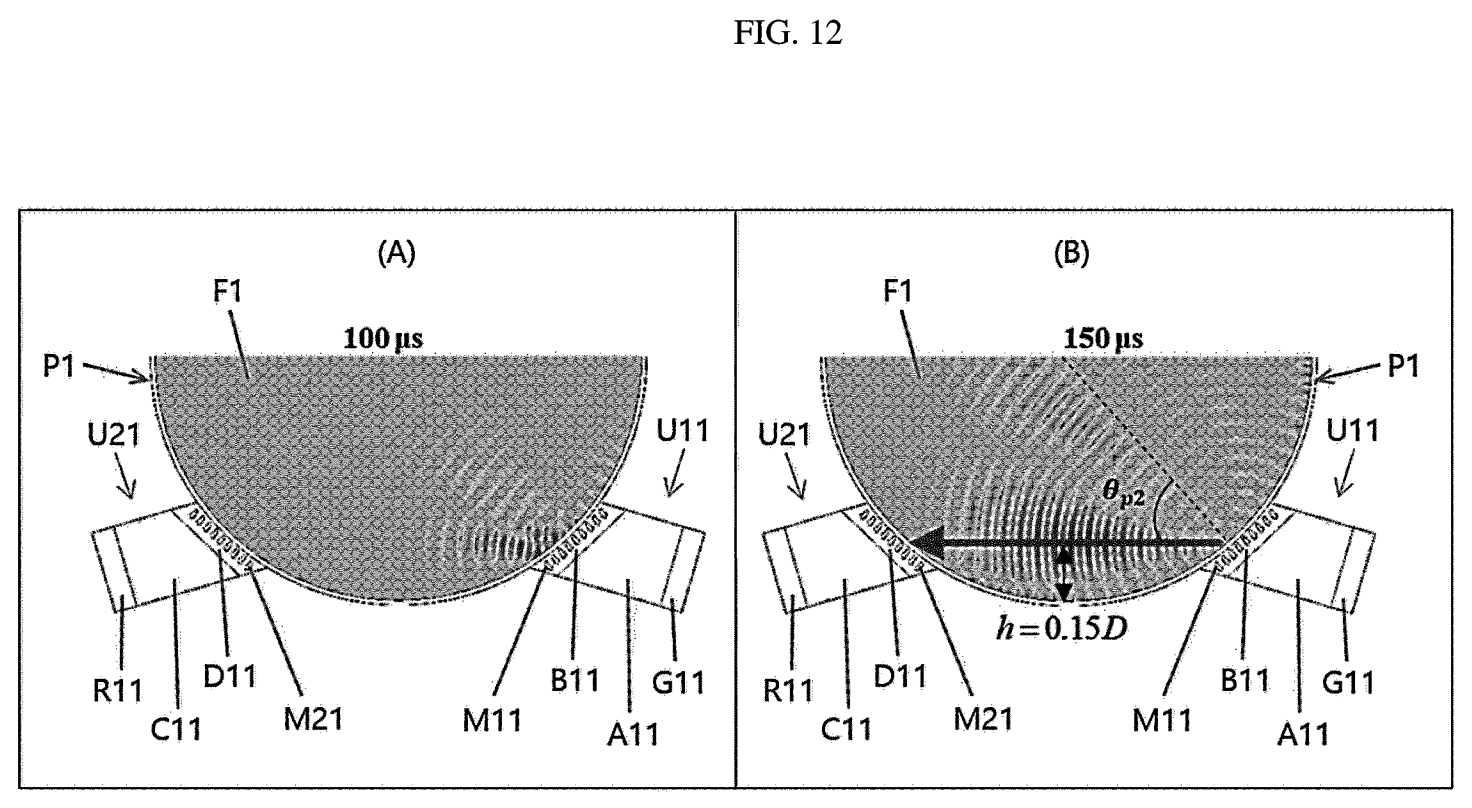

FIG. 12 is a diagram illustrating the simulation results obtained by evaluating the minimum height of measurable foreign substances in the pipe P1 by using the measuring device according to an embodiment of the present invention.

Referring to FIG. 12, the measuring device according to the above embodiment may include an ultrasonic transmitting unit U11 and an ultrasonic reception unit U21. The ultrasonic transmitting unit U11 may include an ultrasonic generator G11, a first transmission medium unit A11, a second transmission medium unit B11, and a 1-1 ultrasound type conversion unit M11 formed in the second transmission medium unit B11. The ultrasonic receiving unit U21 may include the ultrasound receiver R11, the first receiving medium unit C11, the second receiving medium unit D11, and the 1-2 ultrasound type conversion unit M21 formed in the second receiving medium unit D11. It may be mentioned that the measuring device according to the above embodiment has a configuration similar to that of the measuring device according to the embodiment described with reference to FIG. 7.

In the measuring device according to the above embodiment, the ultrasonic transmitting unit U11 and the ultrasonic reception unit U21 may be disposed symmetrically with respect to the pipe P1. In this case, the ultrasonic transmitting unit U11 and the ultrasonic receiving unit U21 may be disposed at the same or substantially similar height with the pipe P1 interposed therebetween. In addition, the ultrasonic transmitting unit U11 and the ultrasonic receiving unit U21 may be disposed to form an inner angle of less than about 180° in a downward direction of the pipe P1 while the setting the pipe P1 as a center. Therefore, the ultrasonic transmitting unit U11 and the ultrasonic receiving unit U21 may be disposed adjacent to the lower area of the pipe P1.

As may be seen from the simulation results of FIG. 12, when the incident angle $\theta_0$ is 30° in the measuring device according to the embodiment, the refraction angle $\theta_1$ in the fluid (here, water) is 44.5°, and the minimum height h of a measurable foreign substance is 0.15D, which is much lower than the 0.26D which is a minimum height h of a measurable foreign substance of the measuring device according to the comparative example.

As may be seen from the simulation results of FIGS. 10 to 12, when the meta-slab ultrasound transducer according to an embodiment of the present invention is used, as it is out of the limits of Snell's law, the measurable height of the foreign substance accumulated in the fluid F1 inside the pipe P1 may be significantly lowered when compared to the comparative example (an existing example).

According to an embodiment, the sound speed of the longitudinal wave in the first transmission medium A11 corresponding to the plastic (PEEK) wedge may be about 1070 m/s, and the sound speed of the longitudinal wave in the fluid F1 corresponding to water may be on the order of 1500 m/s. The second transmission medium part B11 made of steel and the pipe P1 made of steel may be in contact with each other, and the 1-1 ultrasound type conversion unit M11 may be formed in the second transmission medium part B11. The second transmission medium part B11 in which the 1-1 ultrasound type conversion unit M11 is formed and the first part of the pipe P1 in contact therewith may constitute one meta-slab. Therefore, the sound speed of an ultrasound in the meta-slab may be excluded from consideration. In other words, since the meta-slab may be designed in consideration of the thickness of the pipe P1 in the embodiment of the present invention, a sound speed of an ultrasound in the pipe P1 may be excluded from consideration. Therefore, in the case of the embodiment, the refraction angle of the ultrasound may be determined only by the sound speed of the transverse wave in the first transmission medium A11 and the sound speed of the longitudinal wave in the fluid F1. In this regard, when the ultrasound is incident into the fluid F1, the refraction angle may increase. As a result, the measurable minimum height of the foreign substance in the measuring device according to the embodiment may be considerably lowered.

Figure 13:
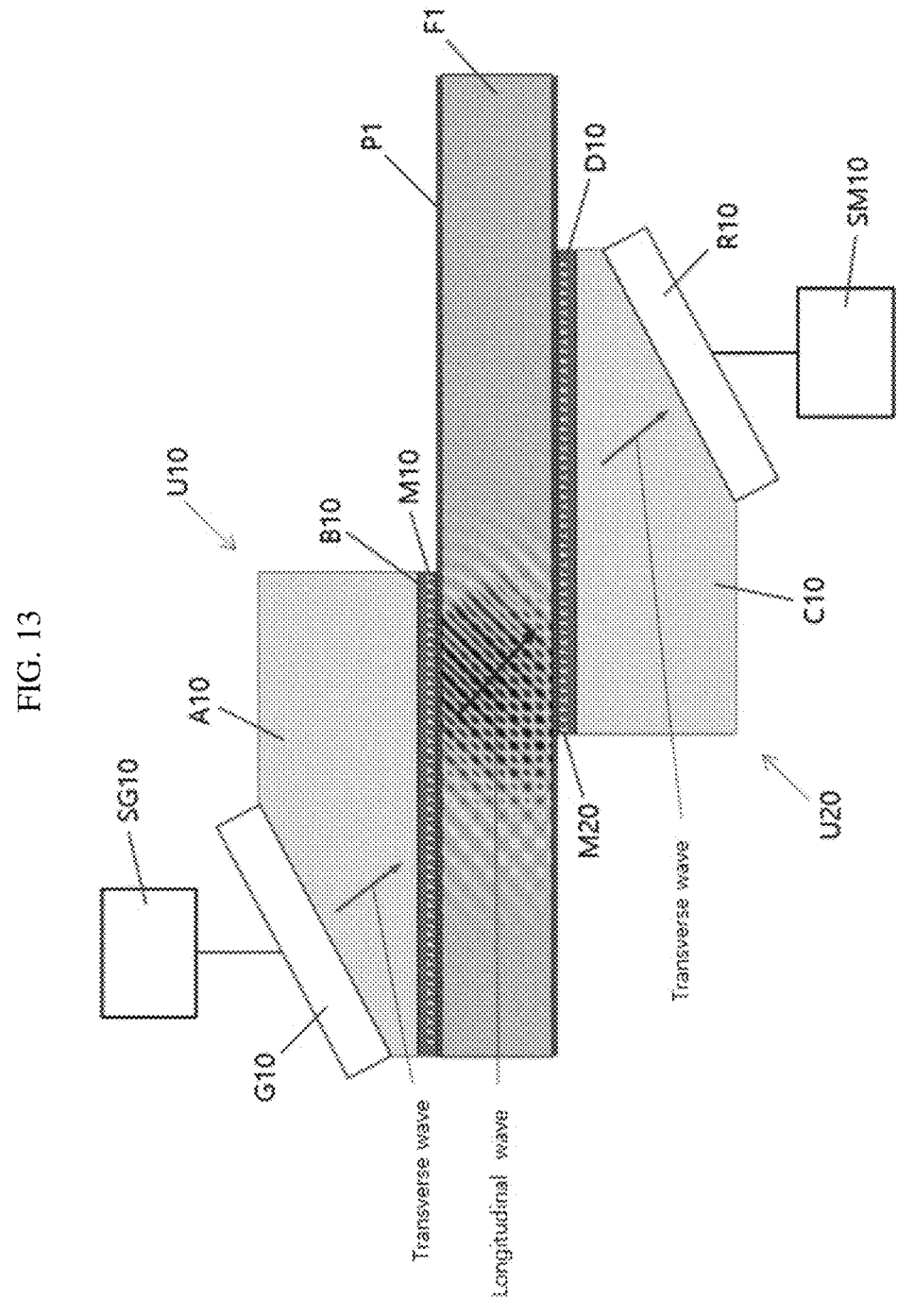
FIG. 13 is a cross-sectional diagram illustrating a mea-suring device for measuring a height of foreign substances in a pipe according to an embodiment of the present inven-tion.

FIG. 13 is a cross-sectional diagram illustrating a measuring device for measuring a height of foreign substances in a pipe according to an embodiment of the present invention.

Referring to FIG. 13, the measuring device according to the embodiment may include an ultrasound transmitting unit U10 disposed in a first area of an outer surface of a pipe P1 through which a fluid F1 flows, and an ultrasound receiving unit U20 disposed in a second area of the outer surface of the pipe P1. The pipe P1 may be formed of a non-plastic substance, for example, a metal substance. For example, the pipe P1 may be a steel pipe.

The ultrasonic transmitting unit U10 may include an ultrasonic generator G10 generating ultrasounds, a first transmission medium unit A10 disposed between the ultrasonic generator G10 and a first area of the pipe P1, a second transmission medium unit B10 disposed in the first transmission medium unit A10 and being in contact with the first area, and a 1-1 ultrasound type conversion unit M10 formed in the second transmission medium unit B10 for converting a type of ultrasound received from the first transmission medium unit A10. A specific configuration of the ultrasound transmitting unit U10 may be the same as or similar to that described with reference to FIGS. 1 and 2.

The ultrasonic receiving unit U20 may include an ultrasound receiver R10, an ultrasonic generator G10 generating ultrasounds, a first receiving medium unit C10 disposed between the ultrasonic generator R10 and a second area of the pipe P1, a second receiving medium unit D10 disposed in the first receiving medium unit C10 and the second area, and in contact with the second area, and a 1-2 ultrasound type conversion unit M20 formed in the second receiving medium unit D10 for converting a type of ultrasound received from the second area. A specific configuration of the ultrasound receiving unit U20 may be the same as or similar to that described with reference to FIG. 7 and the like.

The measuring device may further include a signal generator SG10 connected to the ultrasonic generator G10. The signal generator SG10 may serve to apply a predetermined electrical signal to the ultrasonic generator G10. Ultrasounds may be generated in the ultrasonic generator G10 by the electric signal applied to the ultrasonic generator G10. For example, the signal generator SG10 may include a predetermined function generator.

In addition, the measuring device may further include a signal measurer SM10 connected to the ultrasound receiver R10. The signal measurer SM10 may serve to measure (detect) the ultrasound signal received from the ultrasound receiver R10 or a signal corresponding thereto. For example, the signal measurer SM10 may include an oscilloscope or other measuring devices.

Figure 14:
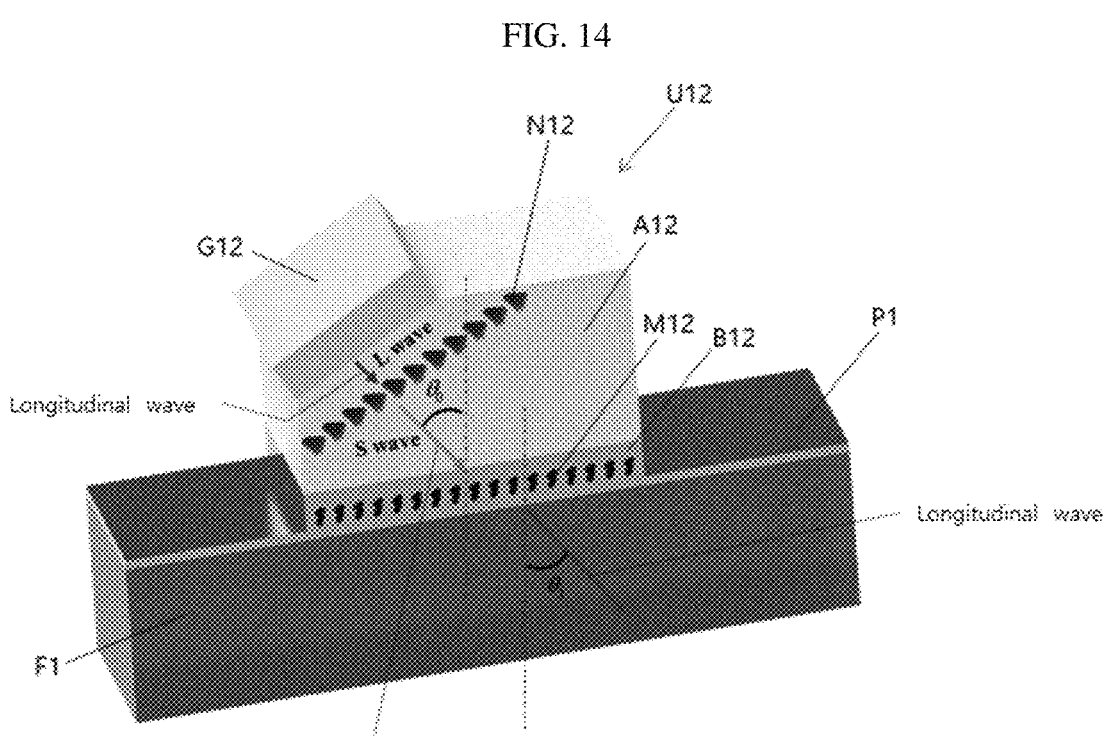
FIG. 14 is a perspective diagram illustrating an ultrasound transmitting unit U12 which may be applied to a measuring device for measuring the height of a foreign substance in a pipe according to another embodiment of the present inven-tion.

FIG. 14 is a perspective diagram illustrating an ultrasound transmitting unit U12 which may be applied to a measuring device for measuring the height of a foreign substance in a pipe according to another embodiment of the present invention.

Referring to FIG. 14, the measuring device for measuring the height of the foreign substance in the pipe according to the present embodiment may include an ultrasound transmitting unit U12. The ultrasound transmitting unit U12 may be disposed in the first area of the outer surface of the pipe P1 through which the fluid F1 passes. The pipe P1 may be formed of a non-plastic substance, for example, a metal substance.

The ultrasound transmitting unit U12 may include an ultrasonic generator G12 generating ultrasounds, a first transmission medium unit A12 disposed between the ultrasonic generator G12 and a first area of the pipe P1, and a first transmission medium unit, a 2-1 ultrasound type conversion unit N12 formed in the first transmission medium unit A12 and configured to convert the type of ultrasounds received from the ultrasonic generator G12, a second transmission medium unit B12 disposed between the first transmission medium unit A12 and the first area and contacting with the first area and, a 1-1 ultrasound type conversion unit M12 formed in the second transmission medium unit B12 to convert the type of ultrasounds received from the first transmission medium unit A12.

In this embodiment, the ultrasonic generator G12 may be an element generating ultrasounds of a longitudinal wave type. When comparing the embodiment of FIG. 2 with the embodiment of FIG. 14, the use of the ultrasonic generator G12 which generates a longitudinal wave as shown in FIG. 14 may have advantages over the ultrasonic generator G10 which generates a transverse wave as shown in FIG. 2 in terms of price and efficiency. Therefore, the structure of the embodiment shown in FIG. 14 may have advantages over the structure of FIG. 2 in terms of efficiency and price (cost).

When using the ultrasonic generator G12 which generates longitudinal waves as in the present embodiment, a 2-1 ultrasound type conversion unit N12 for converting an ultrasound of a longitudinal wave type into an ultrasound of a transverse wave type in the first transmission medium unit A12 may be provided. Using the 2-1 ultrasound type conversion unit N12, it is possible to mode-convert an ultrasound of a longitudinal wave type into an ultrasound of transverse wave type by almost 100%.

The first transmission medium unit A12 and the second transmission medium unit B12 may be made of different substances. The first transmission medium unit A12 may be formed of plastic, and the second transmission medium unit B12 may be formed of metal. The second transmission medium unit B12 may be made of the same substance as the pipe P1 and may come into contact (direct contact) with the pipe P1. The 1-1 ultrasound type conversion unit M12 may be configured to convert ultrasound of transverse wave type into an ultrasound of a longitudinal wave type. The first transmission medium unit A12, the second transmission medium unit B12, and the 1-1 ultrasound type conversion unit M12 may correspond to the first transmission medium unit A10, the second transmission medium unit B10, and the 1-1 ultrasound type conversion unit M10 described with reference to FIGS. 1 and 2, respectively.

The 2-1 ultrasound type conversion unit N12 may include a meta-structure having a unit pattern structure. The 2-1 ultrasound type conversion unit N12 may include an array of the unit pattern structure. The unit pattern structure may include a through-hole area formed in the first transmission medium A12. The through-hole area may be an empty area, but may be filled with a substance different from that of the first transmission medium A12 in some cases. The 2-1 ultrasound type conversion unit N12 may be referred to as a kind of meta-slab. Alternatively, the areas of the 2-1 ultrasound type conversion unit N12 and the first transmission medium unit A12 around it is combined and it may be regarded as one meta-slab. As described with reference to FIGS. 1 and 2, the 1-1 ultrasound type conversion unit M12 may also constitute one meta-slab. Therefore, it may be said that the ultrasound transmitting unit U12 according to the embodiment of FIG. 14 has a double meta-slab structure.

The 2-1 ultrasound type conversion unit N12 and the 1-1st ultrasound type conversion unit M12 may be designed in a predetermined shape so that their operating frequency matches the natural frequency of the ultrasonic generator G12, and it may be manufactured in a manner of making a hole in the corresponding transmission medium unit A12, B12 by using a method such as a wire cutting or a laser cutting or other processing method.

The longitudinal waves generated in the ultrasonic generator G12 are almost completely mode-converted into transverse waves through the 2-1 ultrasound type conversion unit N12 and may vertically transmit through the first transmission medium unit A12. The transverse wave propagating in the first transmission medium unit A12 is obliquely incident to the second transmission medium unit B12 and is almost perfectly mode-converted into a longitudinal wave through the 1-1 ultrasound type conversion unit M12, and may be permeated into the fluid F1. A function and a design of the 1-1 ultrasound type conversion unit M12 may be the same as described with reference to FIGS. 1 and 2.

The 2-1 ultrasound type conversion unit N12 may mode-convert the longitudinal wave generated in the ultrasonic generator G12 into a transverse wave almost perfectly, and transmit the longitudinal wave to the first transmission medium unit A12. The reason why the longitudinal wave generated in the ultrasonic generator G12 is mode-converted into a transverse wave is that the impedance when the ultrasound propagates as a transverse wave in the first transmission medium unit A12 is close to the impedance when the ultrasound propagates as a longitudinal wave in the fluid F1. Accordingly, the transmittance of the ultrasound may be increased and the refraction angle of the ultrasound in the fluid F1 may be widened by allowing the ultrasound to propagate as a transverse wave in the first transmission medium A12.

Hereinafter, the configuration and role of the 2-1 ultrasound type conversion unit N12 will be described in more detail with reference to FIGS. 15 to 17C.

Figure 15:
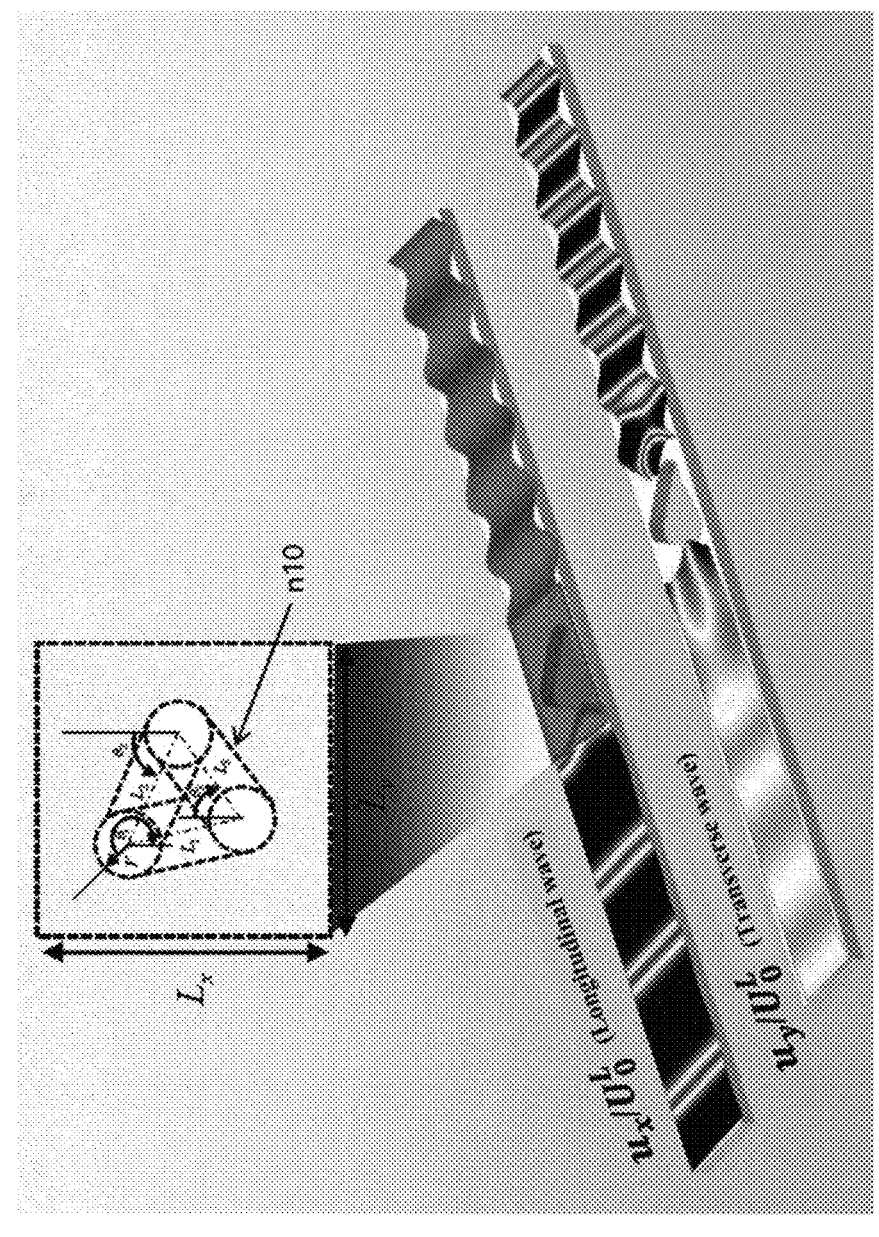
FIG. 15 is simulation data illustrating a mode (type) conversion phenomenon between a longitudinal wave and a transverse wave due to a unit pattern structure which may be applied to the 2-1 ultrasound type conversion unit of FIG. 14.

FIG. 15 is simulation data illustrating a mode (type) conversion phenomenon between a longitudinal wave and a transverse wave due to a unit pattern structure n10 which may be applied to the 2-1 ultrasound type conversion unit N12 of FIG. 14.

Referring to FIG. 15, an ultrasound of a longitudinal wave type may be converted into ultrasound of transverse wave type while passing through the unit pattern structure n10. Also, in the opposite case, the ultrasound of transverse wave type may be converted into an ultrasound of a longitudinal wave type while passing through the unit pattern structure n10.

Figure 16:
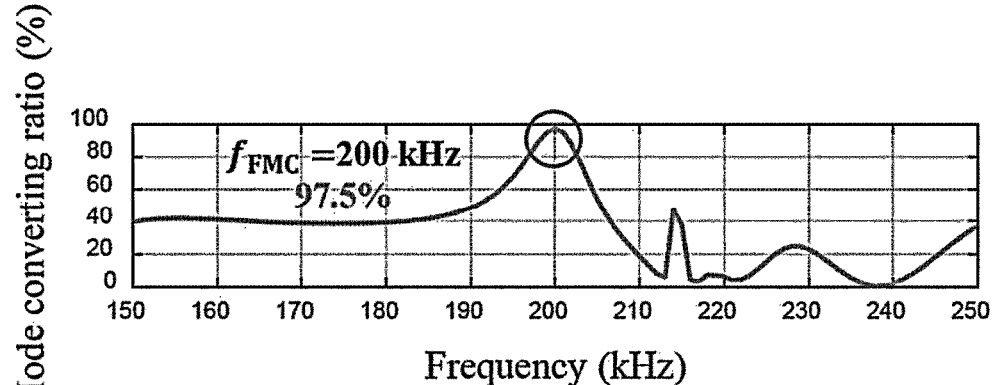
FIG. 16 is a graph illustrating a result obtained by measuring a rate at which longitudinal waves are converted into transverse waves by the unit pattern structure of FIG. 15.

FIG. 16 is a graph illustrating a result obtained by measuring a rate at which longitudinal waves are converted into transverse waves by the unit pattern structure n10 of FIG. 15.

Referring to FIG. 16, when the frequency of ultrasounds is about 200 kHz, the rate at which longitudinal waves are converted into transverse waves by the unit pattern structure (n10 in FIG. 15), that is, the mode conversion rate, may be as high as about 97.5%. Accordingly, nearly 100% mode conversion may be possible by using ultrasounds having a specific frequency. However, the specific frequency (200 kHz) disclosed herein is only exemplary, and the target frequency range may vary according to design conditions.

The shape of the unit pattern structure n10 described above is not limited to those shown in FIGS. 14 and 15 and may be variously changed.

Figure 17A:
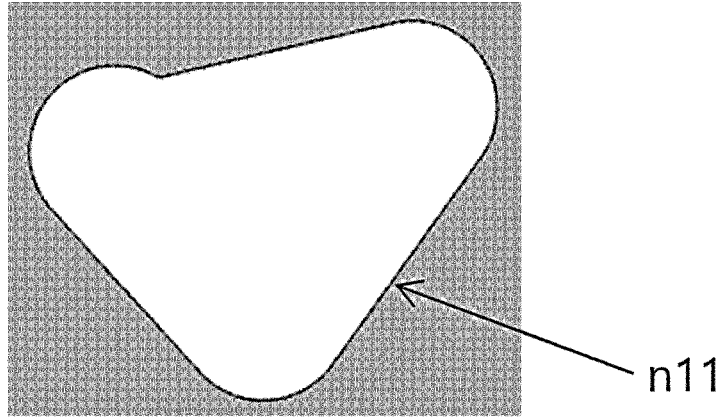
FIG. 17A to FIG. 17C are plan diagrams illustrating various shape designs which may be applied to the unit pattern structure of the 2-1 ultrasound type conversion unit of FIG. 14 according to an embodiment of the present invention.
Figure 17B:
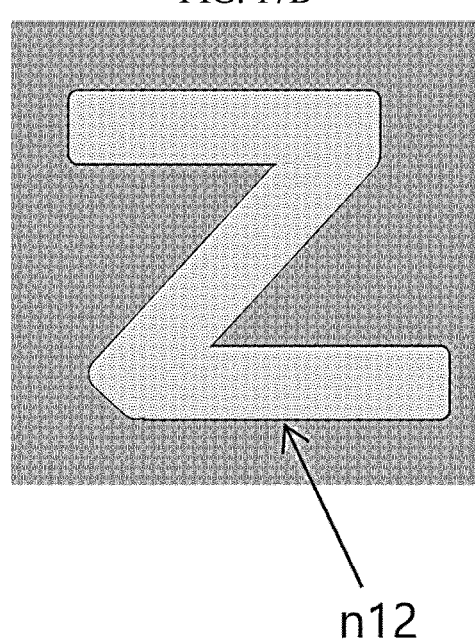
Figure 17C:
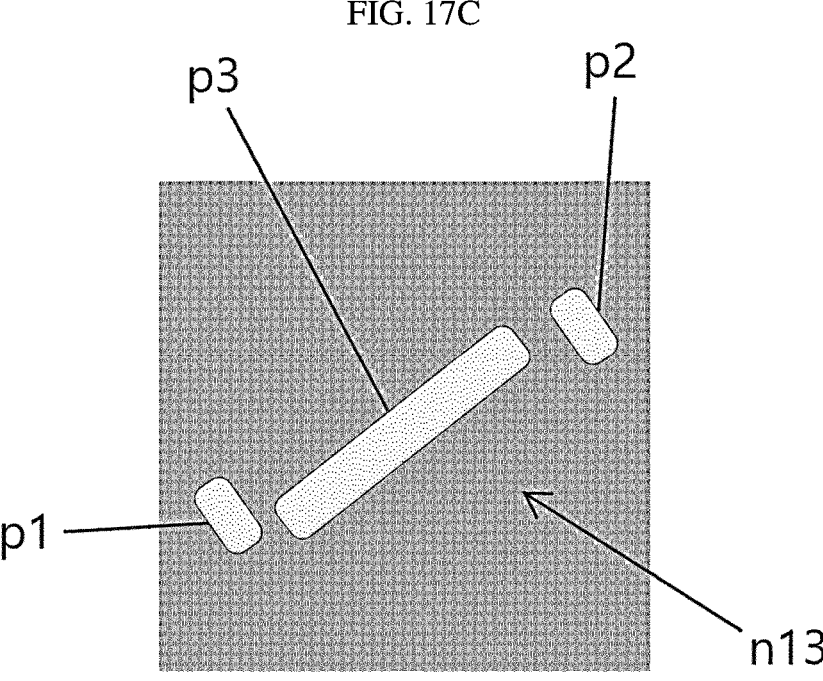

FIG. 17A to FIG. 17C are plan diagrams illustrating various shape designs which may be applied to the unit pattern structure of the 2-1 ultrasound type conversion unit N2 of FIG. 14 according to an embodiment of the present invention.

Referring to FIG. 17A, the cross section of the unit pattern structure n11 may have a changed triangular shape in which three vertex areas are rounded. The unit pattern structure n11 may have a shape similar to the unit pattern structure n10 shown in FIG. 15, that is, a heart shape.

Referring to FIG. 17B, the cross section of the unit pattern structure n12 may have a Z-shape or a shape similar thereto.

Referring to FIG. 17C, the cross section of the unit pattern structure n13 may have a segmented pattern shape including the first and second pattern portions p1 and p2 spaced apart from each other; and a third pattern portion p3 disposed spaced apart therebetween. The first and second pattern portions p1 and p2 may have a relatively short rod shape extending in parallel to each other, and the third pattern portion p3 may have a rod shape extending in a direction perpendicular to (or generally perpendicular to) the first and second pattern portions p1 and p2. The length of the third pattern portion p3 may be longer than the respective lengths of the first and second pattern portions p1 and p2. One end of the third pattern portion p3 may be disposed adjacent to one end of the first pattern portion p1, and the other end of the third pattern portion p3 may be disposed adjacent to one end of the second pattern portion p2. This unit pattern structure n13 may be said to have a so-called %-shape or a form similar thereto.

In addition to the shapes illustrated in FIGS. 17A to 17C, the unit pattern structure of the 2-1 ultrasound type conversion unit N12 may have various modified shapes.

Figure 18:
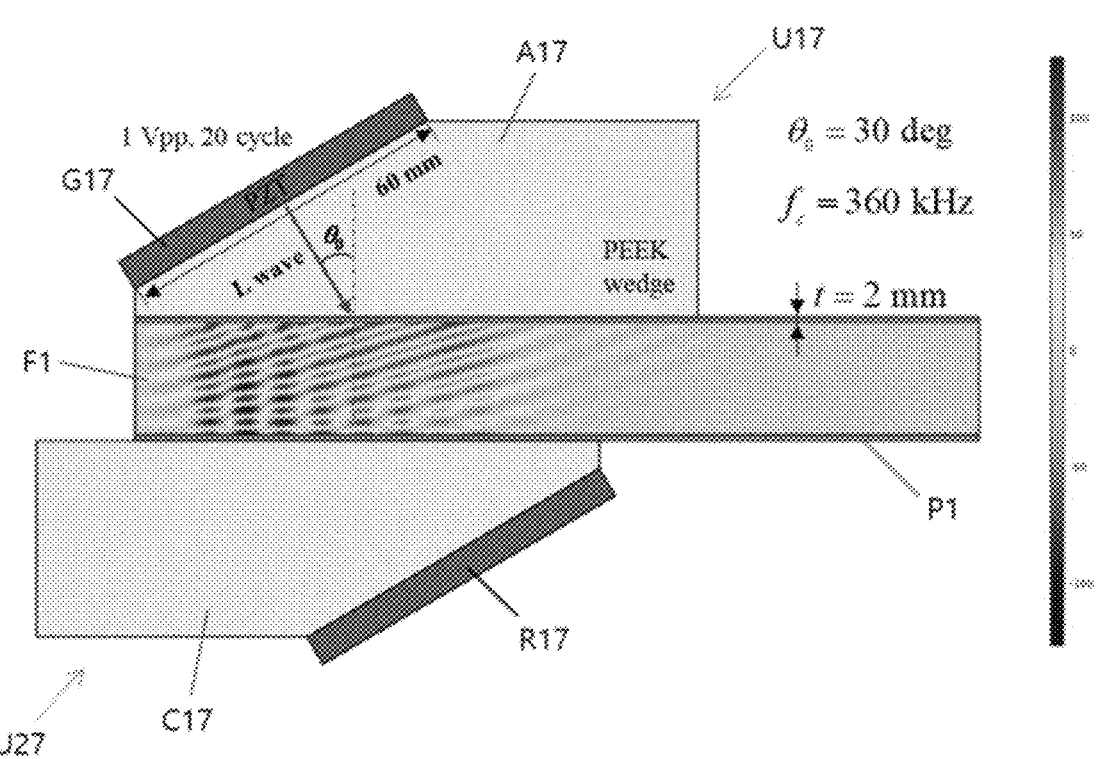
FIG. 18 is a cross-sectional diagram illustrating a mea-suring device for detecting foreign substances in a pipe according to a comparative example.

FIG. 18 is a cross-sectional diagram illustrating a measuring device for detecting foreign substances in a pipe according to a comparative example.

Referring to FIG. 18, the measuring device according to the comparative example includes an ultrasound transmitting unit U17 disposed in a first area of a pipe P1 through which fluid F1 flows and an ultrasonic receiving unit U27 disposed in a second area of the pipe P1. The ultrasound transmitting unit U17 has an ultrasonic generator G17 and a transmission medium unit A17 disposed between the ultrasonic generator G17 and the first area of the pipe P1. The ultrasonic receiving unit U27 has an ultrasound receiver R17 and a receiving medium unit C17 disposed between the ultrasound receiver R17 and the second area of the pipe P1. The ultrasonic generator G17 may be an element which generates longitudinal ultrasounds. The pipe P1 may be a metal pipe, and the transmission medium unit A17 and the receiving medium unit C17 are made of plastic. The measuring device according to the comparative example is different from the measuring device according to the embodiment of the present invention in that it does not include a meta-slab including an ultrasound type conversion unit.

In connection with the measuring device according to the comparative example described with reference to FIG. 18, a simulation was performed by using COMSOL Multiphysics, a commercial program to evaluate transmittance. In this simulation, the incident angle $\theta_0$ was set to 30°. In addition, while applying an electric signal of 360 kHz, 1 Vpp, and 20 cycles which is generated from the ultrasonic generator G17, the signal of the ultrasound receiver R17 was confirmed.

Figure 19:
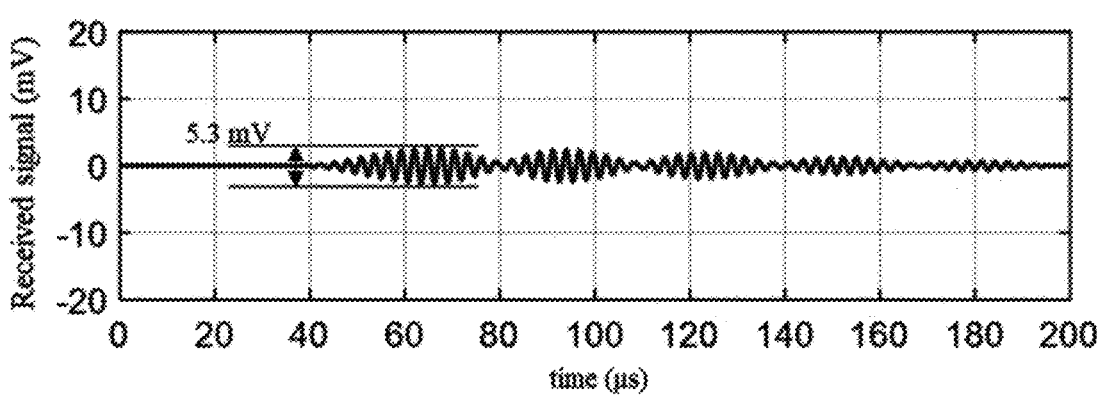
FIG. 19 is a graph illustrating results obtained by mea-suring an ultrasound signal detected in an ultrasound receiver after passing through fluid when measurement is performed by using a measuring device according to a comparative example as shown in FIG. 18.

FIG. 19 is a graph illustrating results obtained by measuring an ultrasound signal detected in an ultrasound receiver R17 after passing through a fluid F1 when measurement is performed by using a measuring device according to a comparative example as shown in FIG. 18.

Referring to FIG. 19, in the case of the measuring device according to the comparative example, ultrasounds generated in the ultrasonic generator G17 are transmitted through the fluid F1 and then detected by the ultrasound receiver R17 on the other side, but at this time, it may be confirmed that the amplitude of the ultrasound signal obtained in the ultrasound receiver R17 is very low.

Figure 20:
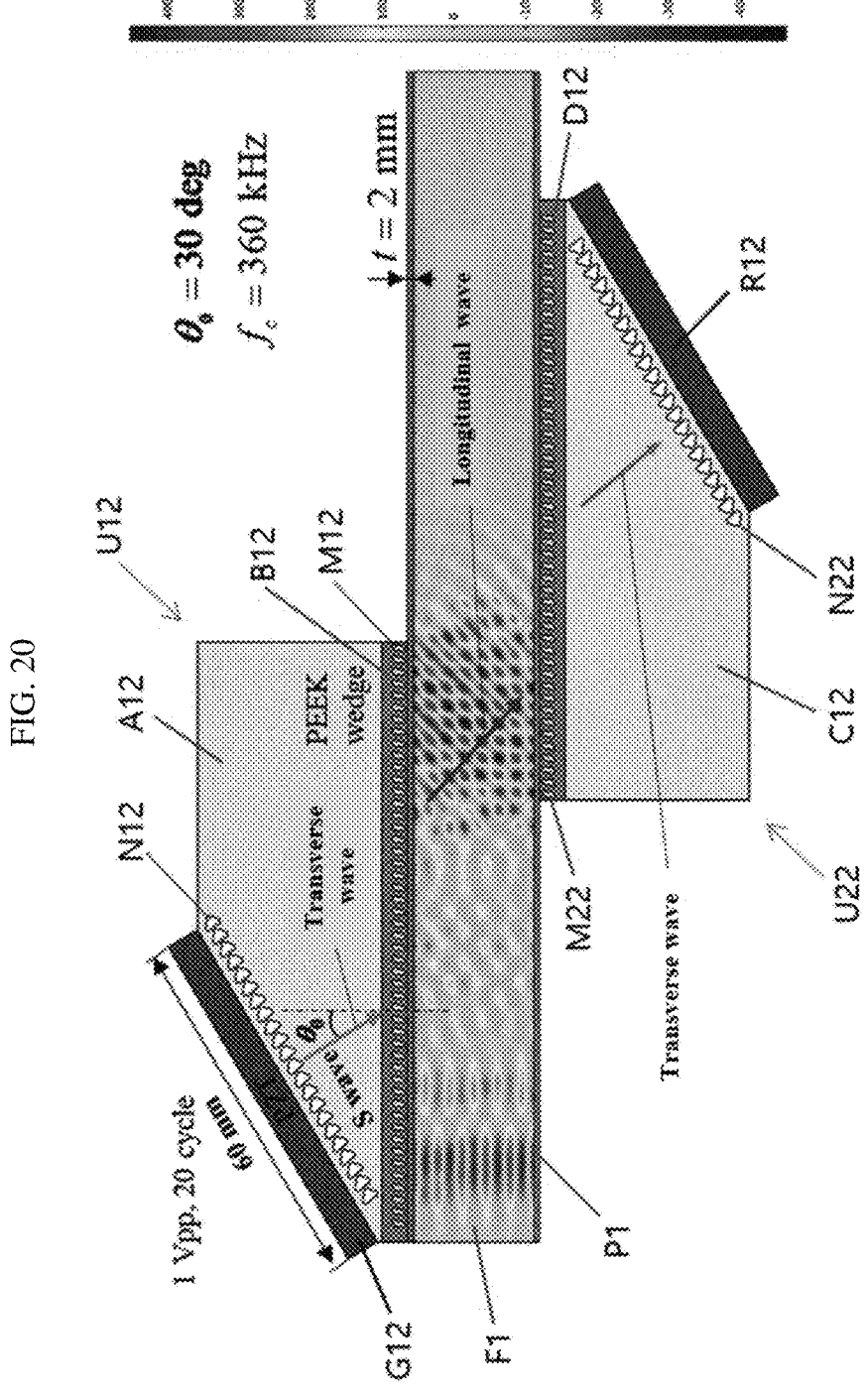
FIG. 20 is a cross-sectional diagram illustrating a measuring device for measuring the height of foreign substances in a pipe according to another embodiment of the present invention.

FIG. 20 is a cross-sectional diagram illustrating a measuring device for measuring the height of foreign substances in a pipe according to another embodiment of the present invention.

Referring to FIG. 20, the measuring device according to the embodiment includes an ultrasound transmitting unit U12 disposed in a first area of an outer surface of a pipe P1 through which a fluid F1 flows, and an ultrasonic receiving unit U22 disposed in the second area of the outer surface of the pipe P1. The pipe P1 may be formed of a non-plastic substance, for example, a metal substance. For example, the pipe P1 may be a steel pipe.

The ultrasonic transmitting unit U12 may include a ultrasonic transmitting unit U12 may include an ultrasonic generator G12 generating ultrasounds, a first transmission medium unit A12 disposed between the ultrasonic generator G12 and a first area of the pipe P1, a 2-1 ultrasound type conversion unit N12 formed in the first transmission medium unit A12 and configured to convert a type of ultrasounds received from the ultrasonic generator G12, a second transmission medium unit B12 disposed between the first transmission medium unit A12 and the first area and contacting the first area, and a 1-1 ultrasound type conversion unit M12 formed in the second transmission medium unit B12 for converting the type of ultrasounds received from the first transmission medium unit A12. The ultrasonic generator G12 may be an element generating longitudinal ultrasounds. The 2-1 ultrasound type conversion unit N12 may serve to convert an ultrasound of a longitudinal wave type into an ultrasound of a transverse wave type. The 1-1 ultrasound type conversion unit M12 may serve to convert transverse wave type ultrasounds into an ultrasound of a longitudinal wave type and transmit them through the fluid F1. A specific configuration of the ultrasonic transmitting unit U12 may be the same as or similar to that described with reference to FIG. 14.

The ultrasound receiving unit U22 includes an ultrasound receiver R12, a first receiving medium part C12 disposed between the ultrasound receiver R12 and the second area of the pipe P1, a 2-2 ultrasound type conversion unit N22 formed in the first reception medium unit C12, a second reception medium D12 disposed between the first reception medium unit C12 and the second area and contacting the second area, and a 1-2 ultrasound type conversion unit M22 formed in the second receiving medium unit D12 for converting the type of ultrasound received from the second area. The 1-2 ultrasound type conversion unit M22 may serve to convert an ultrasound of a longitudinal wave type received from the second area into an ultrasound of a transverse wave type. The 2-2 ultrasound type conversion unit N22 may serve to convert the transverse type ultrasound transmitted through the 1-2 ultrasound type conversion unit M22 into an ultrasound of a longitudinal wave type. The ultrasound receiver R12 may be a device configured to receive an ultrasound of a longitudinal wave type.

The first receiving medium unit C12 and the second receiving medium unit D12 may be made of different substances. The first receiving medium unit C12 may be made of plastic, and the second receiving medium unit D12 may be made of metal. The second receiving medium unit D12 may be made of the same substance as the pipe P1 and may come into contact (direct contact) with the pipe P1. The first receiving medium unit C12, the second receiving medium unit D12, and the 1-2 ultrasound type conversion unit M22 may correspond to the first receiving medium unit C10, the second receiving medium unit D10, and the 1-2 ultrasound type conversion unit M20 described with reference to FIG. 7, respectively.

The 2-2 ultrasound type conversion unit N22 may include a meta-structure having a unit pattern structure. The 2-2 ultrasound type conversion unit N22 may include an array of the unit pattern structure. The unit pattern structure may include a through-hole area formed in the first receiving medium C12. The through-hole area may be an empty area, but may be filled with a substance different from that of the first receiving medium C12 in some cases. A specific configuration of the 2-2 ultrasound type conversion unit N22 may correspond to or be similar to that described for the 2-1 ultrasound type conversion unit N21 with reference to FIGS. 15 to 17C. The 2-2 ultrasound type conversion unit N22 may be referred to as a kind of meta-slab. Alternatively, the areas of the 2-2 ultrasound type conversion unit N22 and the first receiving medium unit C12 around it may be combined and the combined area may be regarded as one meta-slab. The 1-2 ultrasound type conversion unit M22 may also constitute one meta-slab. Therefore, it may be said that the ultrasonic receiving unit U22 according to the embodiment of FIG. 20 has a double meta-slab structure.

In connection with the measuring device according to the embodiment as described in FIG. 20, a simulation was performed by using COMSOL Multiphysics, a commercial program in order to evaluate transmittance. In the simulation, the incident angle $\theta_0$ was set to 30°. In addition, while applying an electric signal of 360 kHz, 1 Vpp, 20 cycles from the ultrasonic generator G12, the signal of the ultrasound receiver R12 was confirmed.

Figure 21:
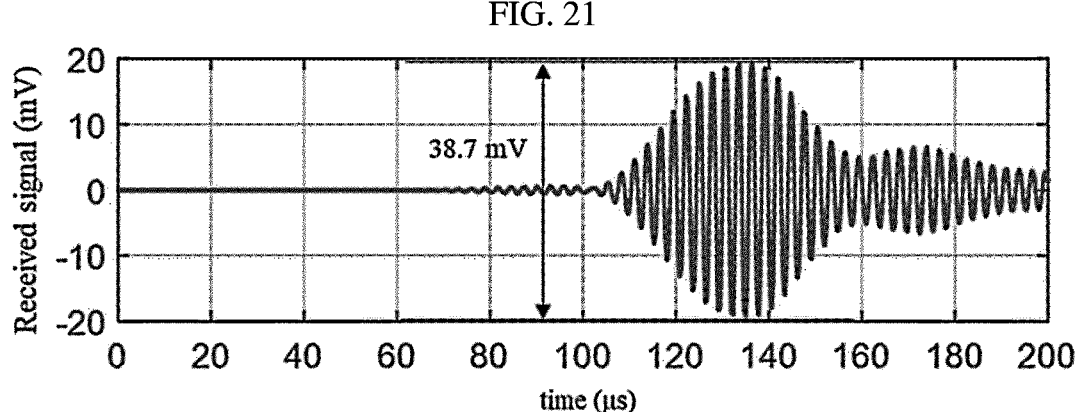
FIG. 21 is a graph illustrating the results obtained by measuring an ultrasound signal detected in an ultrasound receiver after penetrating a fluid when measurement is performed by using the measuring device according to the embodiment as described in FIG. 20.

FIG. 21 is a graph illustrating the results obtained by measuring an ultrasound signal detected in an ultrasound receiver R12 after penetrating a fluid when measurement is performed by using the measuring device according to the embodiment as described in FIG. 20.

Referring to FIG. 21, in the case of the measuring device according to the embodiment, it may be confirmed that the amplitude of the ultrasonic signal detected in the ultrasound receiver R12 is approximately 7.3 times greater than the result of FIG. 19 according to the comparative example.

Additionally, each of the ultrasonic transmitting unit U12 and ultrasonic receiving unit U22 in FIG. 20 may have a prefabricated structure. That is, the second transmission medium unit B12 in which the 1-1 ultrasound type conversion unit M12 is formed may be detachably attached to the first transmission medium unit A12. In addition, the second reception medium unit D12 in which the 1-2 ultrasound type conversion unit M22 is formed may be detachably attached to the first reception medium unit C12. The assembled structure may be the same as or similar to that described with reference to FIG. 9.

Figure 22:
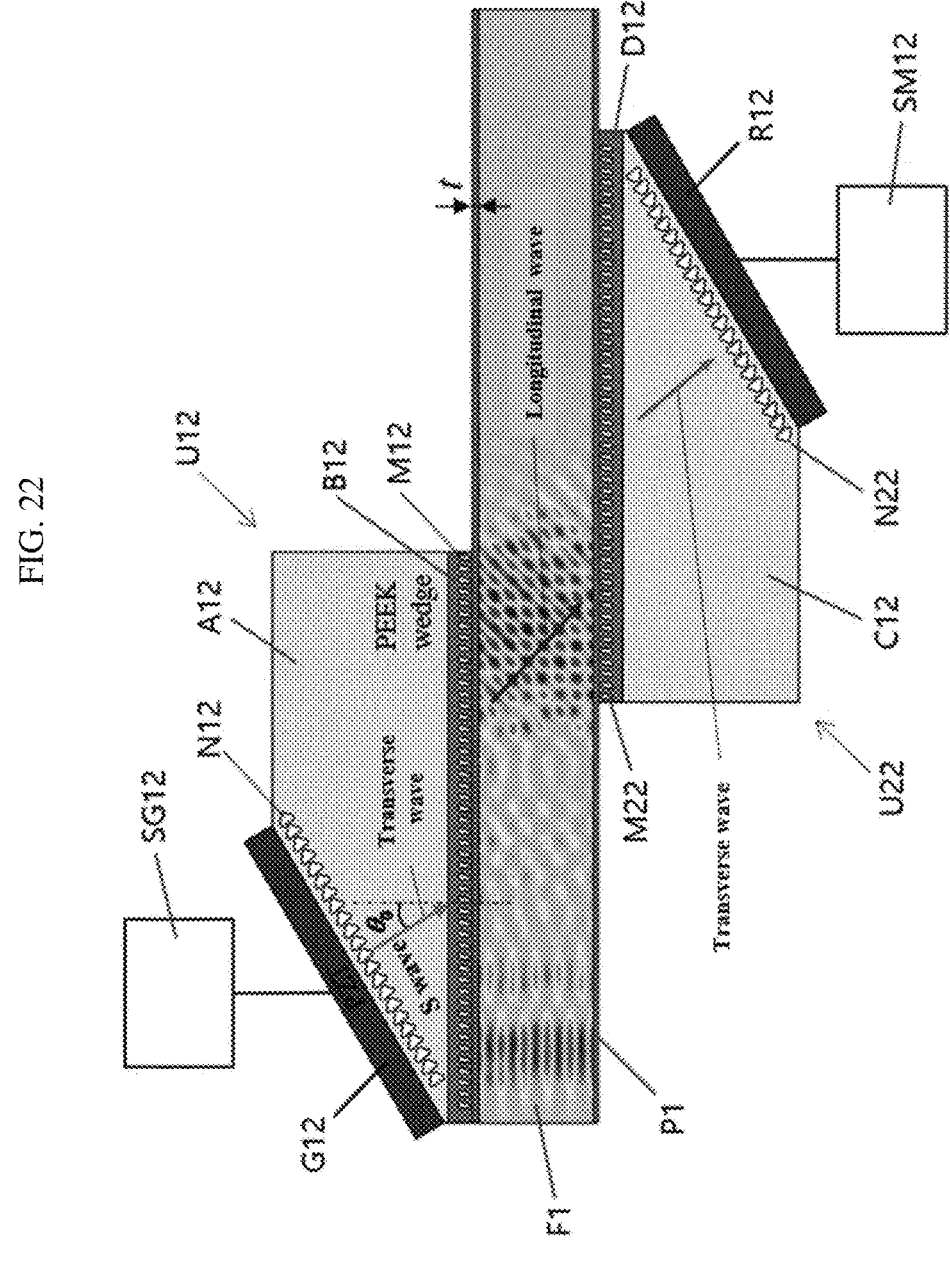
FIG. 22 is a cross-sectional diagram illustrating a measuring device for measuring the height of foreign substances in a pipe according to another embodiment of the present invention.

FIG. 22 is a cross-sectional diagram illustrating a measuring device for measuring the height of foreign substances in a pipe according to another embodiment of the present invention.

Referring to FIG. 22, the measuring device according to the embodiment may include an ultrasonic transmitting unit U12 disposed in a first area of an outer surface of a pipe P1 through which a fluid F1 flows, and an ultrasound receiving unit U22 disposed a second area of the outer surface of the pipe P1. The pipe P1 may be formed of a non-plastic substance, for example, a metal substance. For example, the pipe P1 may be a steel pipe.

The ultrasonic transmitting unit U12 may include an ultrasonic generator G12, a first transmission medium unit A12, a 2-1 ultrasound type conversion unit N12, a second transmission medium unit B12, and a 1-1 ultrasound type conversion unit M12. The ultrasonic receiving unit U22 includes an ultrasound receiver R12, a first receiving medium unit C12, a 2-2 ultrasound type conversion unit N22, a second receiving medium unit D12, and a 1-2 ultrasound type conversion unit M22. Specific configurations of the ultrasound transmitting unit U12 and the ultrasound reception unit U22 may be the same as or similar to those described with reference to FIG. 20.

The measuring device may further include a signal generator SG12 connected to the ultrasonic generator G12. In addition, the measurement device may further include a signal measuring device SM12 connected to the ultrasound receiver R12. The signal generator SG12 and the signal measurer SM12 may be the same as or similar to those described with reference to FIG. 13.

According to the embodiments of the present invention described above, it is possible to measure the height of a foreign substance in a pipe by using a non-invasive manner for a pipe made of a non-plastic substance (e.g., metal, etc.), to easily measure the height of the foreign substance regardless of the type of foreign substance and it is possible to implement a measuring device capable of greatly lowering the measurable height of foreign substance. When using the measuring device according to the embodiments, it is possible to greatly improve the ultrasonic transmission characteristics of a pipe made of non-plastic substance (ex, metal, etc.), and also reduce the impedance difference between the fluid in the pipe and the measuring device. As a result, the height of the measurable foreign substance may be greatly reduced, and the measurement angle range may be widened. In addition, according to one embodiment of the present invention, since is it not only easy to assemble and fasten, but also, the type of the meta-slab and the medium unit may be easily changed if necessary, the configuration/characteristics/conditions of the measuring device may be appropriately changed according to the actual usage conditions and circumstances. According to this embodiment of the present invention, since various types of foreign substances in the pipe may be detected without impact or damage to the pipe, and foreign substances having a low height may be easily detected, it may be usefully applied for the maintenance and management of the pipe and facilities including the same. In addition, the structure and the method according to the embodiment may be applied to the detection of inner foreign substance for the pipe and other structures similar to the pipe.

The measuring device according to an embodiment of the present invention may measure the low accumulation height of foreign substance in pipes or other structures, detect cracks or damage in a wide angular range in the fluid inside the structure, and it may also be applied to a brain scanning and the like. In the brain scanning, the skull may serve as a metal specimen in measuring the obstacle of the fluid inside the structure. If the prefabricated meta-slab ultrasonic sensor according to an embodiment of the present invention is used, it may reduce energy loss in the skull and may increase the efficiency of energy reaching the brain from the sensor. The shape of the meta-slab may be optimized and designed according to the operating frequency, the substance of the wedge, and the physical properties of the skull and internal tissues to be measured.

In the present specification, the preferred embodiments of the present invention have been disclosed, and although specific terms are used, these are only used in a general sense to easily describe the technological contents of the present invention and to help the understanding of the present invention, and are not used to limit the scope of the present invention. It will be apparent to those of ordinary skill in the art to which the present invention pertains that other modifications based on the technological spirit of the present invention may be implemented in addition to the embodiments disclosed herein. It will be appreciated to those of ordinary skill in the art that a measuring device for measuring the height of foreign substances in the pipe according to the embodiments described with reference to FIGS. 1 to 22 may be variously substituted, changed and modified without departing from the spirit of the present invention. Therefore, the scope of the invention should not be determined by the described embodiments, but should be determined by the technological concepts described in the claims.

INDUSTRIAL APPLICABILITY

The measuring device according to an embodiment of the present invention may measure the low accumulation height of foreign substance in pipes or other structures, detect cracks or damage in a wide angular range in the fluid inside the structure, and it may also be applied to a brain scanning and the like. In the brain scanning, the skull may serve as a metal specimen in measuring the obstacle of the fluid inside the structure. If the prefabricated meta-slab ultrasonic sensor according to an embodiment of the present invention is used, it may reduce energy loss in the skull and may increase the efficiency of energy reaching the brain from the sensor. The shape of the meta-slab may be optimized and designed according to the operating frequency, the substance of the wedge, and the physical properties of the skull and internal tissues to be measured.

The invention claimed is:

1. A measuring device for measuring a height of foreign substance in a pipe comprising:

an ultrasonic transmitting unit disposed in a first region of an outer surface of the pipe through which the fluid passes inside thereof, and including an ultrasonic generator generating ultrasounds, a first transmission medium unit disposed between the ultrasonic generator and the first region, a second transmission medium unit disposed between the first transmission medium unit and the first region and contacting the first region, and a first ultrasound type conversion unit formed in the second transmission medium unit for converting the type of ultrasound received from the first transmission medium unit;

an ultrasonic receiving unit disposed in a second region of the outer surface of the pipe, and including an ultrasonic receiver, a first reception medium unit disposed between the ultrasonic receiver and the second region, a second reception medium unit disposed between the first reception medium unit and the second region and contacting the second region, and a second ultrasound type conversion unit formed in the second reception medium unit for converting the type of an ultrasound received from the second region; and a signal measuring unit configured to measure an ultrasonic signal output from the ultrasonic receiver or a signal corresponding thereto, wherein the ultrasonic generator generates a first ultrasound of a transverse wave type, wherein the first ultrasound mode conversion unit is configured to convert the first ultrasound of the transverse wave type into a second ultrasound of a longitudinal wave type, wherein the second ultrasound of a longitudinal wave type propagates through the fluid inside the pipe and is received by the ultrasonic receiving unit, wherein the second ultrasound type conversion unit is configured to convert the second ultrasound of the longitudinal type into a third ultrasound of a transverse wave type, wherein the signal measuring unit is configured to analyze variations in intensity, attenuation, and signal characteristics of the third ultrasound of the transverse wave type converted by the second ultrasound type conversion unit, and to calculate a height of the foreign substance present inside the pipe based on the analyzed variations in the signal characteristics.

2. The measuring device for measuring a height of foreign substance in a pipe of claim 1, wherein the pipe is made of metal, and the second transmission medium part and the second reception medium part are made of metal.

3. The measuring device for measuring a height of foreign substance in a pipe of claim 1,

wherein the first transmission medium unit and the first reception medium unit is formed of plastic, wherein the second transmission medium unit and the second reception medium unit is formed of metal.

4. The measuring device for measuring a height of foreign substance in a pipe of claim 3, wherein the pipe is made of metal, and the second transmission medium part and the second reception medium are made of metal.

5. The measuring device for measuring a height of foreign substance in a pipe of claim 1, wherein the ultrasound transmitting unit has an assembly structure, and the second transmission medium unit in which the 1-1 ultrasound type conversion unit is formed is detachably attached to the first transmission medium unit, wherein the ultrasound receiving unit has an assembly type structure, and the second receiving medium unit in which the 1-2 ultrasound type conversion unit is formed is configured to be detachable from the first receiving medium unit.

6. The measuring device for measuring a height of foreign substance in a pipe of claim 1, wherein the 1-1 ultrasound mode conversion unit is configured to convert a ultrasound of a transverse wave type into an ultrasound of a longitudinal wave type, wherein the 1-2 ultrasound type conversion unit is configured to convert ultrasound of a longitudinal type into an ultrasound of a transverse wave type.

7. The measuring device for measuring a height of foreign substance in a pipe of claim 1, wherein at least one of the 1-1 ultrasonic mode conversion unit and the 1-2 ultrasonic mode conversion unit may include a meta-structure having a unit pattern structure.

8. The measuring device for measuring a height of foreign substance in a pipe of claim 7, wherein the unit pattern structure includes a through-hole region formed in the second transmission medium unit or the second reception medium unit.

9. The measuring device for measuring a height of foreign substance in a pipe of claim 1, wherein the ultrasonic generator is configured to generate transverse wave type ultrasounds.

10. The measuring device for measuring a height of foreign substance in a pipe of claim 1, further comprising:

a 2-1 ultrasound type conversion unit formed in the first transmission medium unit for converting an ultrasound of a longitudinal wave type into an ultrasound of a transverse wave type; and a 2-2 ultrasound type conversion unit formed in the first receiving medium unit for converting transverse wave type ultrasound into an ultrasound of a longitudinal wave type, wherein the ultrasonic generator is configured to generate an ultrasound of a longitudinal wave type.

11. The measuring device for measuring a height of foreign substance in a pipe of claim 10, wherein at least one of the 2-1 ultrasound type conversion unit and the 2-2 ultrasound type conversion unit includes a meta-structure having a unit pattern structure.

12. The measuring device for measuring a height of foreign substance in a pipe of claim 11, wherein the unit pattern structure includes a through-hole region formed in the first transmission medium unit or the first reception medium unit.

13. The measuring device for measuring a height of foreign substance in a pipe of claim 1, wherein the ultrasonic generator is disposed to form an acute angle with respect to the second transmission medium unit, and the ultrasound receiver is disposed to form an acute angle with respect to the second reception medium unit.

14. The measuring device for measuring a height of foreign substance in a pipe of claim 1, wherein a first inclined surface may be formed in the first transmission medium unit, and the ultrasonic generator is disposed on the first inclined surface.

15. The measuring device for measuring a height of foreign substance in a pipe of claim 1, wherein a second inclined surface is formed in the first reception medium unit, and the ultrasound receiver is disposed on the second inclined surface.

16. The measuring device for measuring a height of foreign substance in a pipe of claim 1, further comprising:

a 2-1 ultrasound type conversion unit formed in the first transmission medium unit for converting an ultrasound of a longitudinal wave type into an ultrasound of a transverse wave type; and a 2-2 ultrasound type conversion unit formed in the first receiving medium unit for converting transverse wave type ultrasound into an ultrasound of a longitudinal wave type.

17. The measuring device for measuring a height of foreign substance in a pipe of claim 16, wherein at least one of the 2-1 ultrasound type conversion unit and the 2-2 ultrasound type conversion unit includes a meta-structure having a unit pattern structure.

18. The measuring device for measuring a height of foreign substance in a pipe of claim 17, wherein the unit pattern structure includes a through-hole region formed in the first transmission medium unit or the first reception medium unit.

19. The measuring device for measuring a height of foreign substance in a pipe of claim 1, wherein the ultrasonic generator is configured to generate an ultrasound of a longitudinal wave type.

* * * * *